United States Patent
Nixon et al.

(10) Patent No.: US 10,877,465 B2
(45) Date of Patent: Dec. 29, 2020

(54) PROCESS DEVICE CONDITION AND PERFORMANCE MONITORING

(71) Applicant: FISHER-ROSEMOUNT SYSTEMS, INC., Round Rock, TX (US)

(72) Inventors: Mark J. Nixon, Round Rock, TX (US); Joshua B. Kidd, Safety Harbor, FL (US); Michael J. Boudreaux, Round Rock, TX (US); Shawn W. Anderson, Haverhill, IA (US); Eric Rotvold, West Saint Paul, MN (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 171 days.

(21) Appl. No.: 15/332,521

(22) Filed: Oct. 24, 2016

(65) Prior Publication Data
US 2018/0113442 A1 Apr. 26, 2018

(51) Int. Cl.
G05B 19/418 (2006.01)

(52) U.S. Cl.
CPC .......... *G05B 19/4184* (2013.01); *G05B 2219/32191* (2013.01); *Y02P 90/02* (2015.11)

(58) Field of Classification Search
None
See application file for complete search history.

(56) References Cited

U.S. PATENT DOCUMENTS

| | | |
|---|---|---|
| 5,311,562 A | 5/1994 | Palusamy et al. |
| 6,754,601 B1 | 6/2004 | Eryurek et al. |
| 7,970,830 B2 | 6/2011 | Staggs et al. |
| 8,068,504 B2 | 11/2011 | Brindle et al. |

(Continued)

FOREIGN PATENT DOCUMENTS

| | | |
|---|---|---|
| EP | 2 660 667 A2 | 11/2013 |
| EP | 2 778 817 A1 | 9/2014 |

(Continued)

OTHER PUBLICATIONS

Boudreaux, M., "What a smart device ecosystem looks like," Plant Services (Mar. 8, 2016), http://www.plantservices.com/articles/2016/au-iiot-automation-zone-smart-device-ecosystem/ 6 pages.

(Continued)

*Primary Examiner* — Benjamin P Sandvik
(74) *Attorney, Agent, or Firm* — Marshall, Gerstein & Borun LLP

(57) ABSTRACT

Securing communications from a process plant to a remote system includes a data diode disposed there between that allows data to egress from the plant but prevents ingress of data into the plant and its associated systems. Process plant data from the secure communications is then analyzed to detect conditions occurring at process plant entities in the process plant using various machine learning techniques. When the process plant entity is a valve, the mode of operation for the valve is determined and a different analysis is applied for each mode in which a valve operates. Additionally, the process plant data for each valve is compared to other valves in the same process plant, enterprise, industry, etc. Accordingly, the health of each of the valves is ranked relative to each other and the process plant data for each valve is displayed in a side-by-side comparison.

16 Claims, 11 Drawing Sheets

(56) References Cited

U.S. PATENT DOCUMENTS

| | | | |
|---|---|---|---|
| 8,204,717 B2 | 6/2012 | McLaughlin et al. | |
| 8,555,381 B2 | 10/2013 | McLaughlin et al. | |
| 9,128,472 B2 | 9/2015 | Lawson et al. | |
| 9,143,563 B2 | 9/2015 | Pingel et al. | |
| 9,217,999 B2 | 12/2015 | Domke et al. | |
| 9,218,000 B2 | 12/2015 | McLaughlin et al. | |
| 9,218,470 B2 | 12/2015 | Domke et al. | |
| 9,244,042 B2 | 1/2016 | Rank | |
| 9,253,054 B2 | 2/2016 | Maturana et al. | |
| 9,256,222 B2 | 2/2016 | Blount et al. | |
| 9,274,518 B2 | 3/2016 | Pai et al. | |
| 9,292,012 B2 | 3/2016 | Sayyarrodsari et al. | |
| 9,304,511 B2 | 4/2016 | Blount et al. | |
| 9,363,336 B2 | 6/2016 | Lawson et al. | |
| 9,412,137 B2 | 8/2016 | McLaughlin et al. | |
| 9,413,852 B2 | 8/2016 | Lawson et al. | |
| 9,430,589 B2 | 8/2016 | Eitzman et al. | |
| 9,438,648 B2 | 9/2016 | Asenjo et al. | |
| 9,467,500 B2 | 10/2016 | Maturana et al. | |
| 9,477,936 B2 | 10/2016 | Lawson et al. | |
| 9,489,832 B2 | 11/2016 | Nair et al. | |
| 9,934,671 B1* | 4/2018 | Anderson | G08B 21/18 |
| 9,967,234 B1 | 5/2018 | Crane et al. | |
| 2002/0087708 A1 | 7/2002 | Low et al. | |
| 2002/0161927 A1 | 10/2002 | Inoue et al. | |
| 2003/0005486 A1 | 1/2003 | Ridolfo et al. | |
| 2003/0088698 A1 | 5/2003 | Singh et al. | |
| 2004/0148135 A1 | 7/2004 | Balakrishnan et al. | |
| 2004/0186927 A1 | 9/2004 | Eryurek et al. | |
| 2005/0007249 A1 | 1/2005 | Eryurek et al. | |
| 2005/0060323 A1 | 3/2005 | Leung et al. | |
| 2005/0165939 A1 | 7/2005 | Nikunen et al. | |
| 2006/0020788 A1 | 1/2006 | Han et al. | |
| 2006/0241907 A1 | 10/2006 | Armstrong et al. | |
| 2007/0165591 A1 | 7/2007 | Higure et al. | |
| 2008/0082302 A1* | 1/2008 | Samardzija | |
| 2008/0208527 A1* | 1/2008 | Kavaklioglu | |
| 2008/0123852 A1 | 5/2008 | Jiang | |
| 2008/0183336 A1* | 7/2008 | Dykstra | G05B 13/041 700/282 |
| 2009/0019169 A1 | 1/2009 | Li et al. | |
| 2010/0153969 A1 | 6/2010 | Dyba et al. | |
| 2010/0168931 A1 | 7/2010 | Nasle | |
| 2011/0231478 A1 | 9/2011 | Wheeler et al. | |
| 2012/0250517 A1 | 10/2012 | Saarimaki et al. | |
| 2013/0117556 A1* | 1/2013 | Coleman | |
| 2013/0110274 A1 | 5/2013 | D'Mura et al. | |
| 2013/0185022 A1 | 7/2013 | Maehata et al. | |
| 2013/0211555 A1 | 8/2013 | Lawson et al. | |
| 2013/0212160 A1 | 8/2013 | Lawson et al. | |
| 2013/0212214 A1* | 8/2013 | Lawson | H04L 43/045 709/217 |
| 2013/0223494 A1 | 8/2013 | Jensen et al. | |
| 2014/0068712 A1 | 3/2014 | Frenkel et al. | |
| 2015/0104017 A1 | 4/2015 | Halford et al. | |
| 2015/0127876 A1 | 5/2015 | Erni et al. | |
| 2015/0163198 A1 | 6/2015 | Moore et al. | |
| 2015/0180830 A1 | 6/2015 | Burnett et al. | |
| 2015/0195086 A1 | 7/2015 | Davison | |
| 2015/0264056 A1 | 9/2015 | Mevec et al. | |
| 2015/0281453 A1 | 10/2015 | Maturana et al. | |
| 2015/0295751 A1 | 10/2015 | Caison et al. | |
| 2015/0341469 A1 | 11/2015 | Lawson et al. | |
| 2015/0365512 A1 | 12/2015 | MacKenzie et al. | |
| 2016/0033369 A1 | 2/2016 | Lehofer et al. | |
| 2016/0044507 A1 | 2/2016 | Agiwal et al. | |
| 2016/0134501 A1 | 5/2016 | Timms | |
| 2016/0147206 A1 | 5/2016 | Neitzel et al. | |
| 2016/0153806 A1 | 6/2016 | Ciasulli et al. | |
| 2016/0205133 A1 | 7/2016 | Mackey et al. | |
| 2016/0282859 A1 | 9/2016 | Wilber et al. | |
| 2016/0357175 A1 | 12/2016 | Verma | |
| 2017/0054687 A1* | 2/2017 | Ishigaki | H04L 63/0227 |
| 2017/0289104 A1 | 10/2017 | Shankar et al. | |
| 2017/0347264 A1 | 11/2017 | Holland et al. | |
| 2018/0032405 A1 | 2/2018 | Chen et al. | |
| 2018/0060604 A1 | 3/2018 | Bent et al. | |
| 2018/0112795 A1* | 4/2018 | Anderson | G05B 23/024 |

FOREIGN PATENT DOCUMENTS

| | | |
|---|---|---|
| EP | 2 924 571 A2 | 9/2015 |
| GB | 2 488 369 A | 8/2012 |
| GB | 2 505 297 A | 2/2014 |
| GB | 2 536 059 A | 9/2016 |
| WO | WO-2004/074947 A2 | 9/2004 |
| WO | WO-2010/079260 A1 | 7/2010 |
| WO | WO-2014/094982 A1 | 6/2014 |

OTHER PUBLICATIONS

Mintchell, G., "Plethora of Protocols," The Manufacturing Connection (Mar. 22, 2016), http://themanufacturingconnection.com/2016/03/plethora-of-protocols/ 3 pages.

Obregon, L., "Secure architecture for industrial control systems," The SANS Institute (2015), 27 pages.

Press Release: Dell Teams With GE, Microsoft, OSIsoft, PTC, SAP, Software AG and Others to Advance the Internet of Things, Dell (Apr. 19, 2016), http://www.dell.com/learn/us/en/uscorp1/press-releases/2016-04-19-dell-teams-with-ge-microsoft-osisoft-sap-software-ag-and-others 3 pages.

Resnick, C., "OPC Foundation Announces OPC UA Open Source Availability, Support of Publish / Subscribe, and Collaborative Strategy with OMG," ARC Advisory Group (Apr. 6, 2016), http://www.arcweb.com/blog/post/1095 2 pages.

Technical Overview: How does a data diode work?, Advenica AB (accessed Oct. 19, 2016), https://www.advenica.com/en/cds/securicds-data-diode/technical-overview 3 pages.

Uniformance Asset Sentinel Brochure, Honeywell International Inc. (2015), https://www.honeywellprocess.com/library/marketing/brochures/uniformance-asset-sentinel-brochure.pdf 8 pages.

International Search Report and Written Opinion for Application No. PCT/US2017/057145, dated Jan. 30, 2018.

International Search Report for Application No. PCT/US2017/057162, dated Mar. 26, 2018.

Search Report for Application No. GB1717368.3, dated Feb. 26, 2018.

Written Opinion for International Application No. PCT/US2017/057162, dated Mar. 26, 2018.

Examination Report for GCC Application No. 2017/34160, dated Apr. 21, 2019.

Examination Report for GCC Application No. 2017/34159, dated Apr. 15, 2019.

Barker et al., "The Application of Data Diodes for Securely Connecting Nuclear Power Plant Safety Systems to the Corporate IT Network," 7th IET International Conference on System Safety (2012).

Helson, "The HART )RTM) Protocol—A Solution Enabling Technology," (2013).

Search Report for Application No. GB1717357.6, dated Apr. 18, 2018.

Search Report for Application No. GB1717365.9, dated Apr. 18, 2018.

Search Report for Application No. GB1717366.7, dated Apr. 18, 2018.

* cited by examiner

PROCESS DEVICE CONDITION AND PERFORMANCE MONITORING

RELATED REFERENCES

The present disclosure is related to co-owned U.S. patent application Ser. No. 14/507,188, filed Oct. 6, 2014 and entitled "Regional Big Data in Process Control Systems"; U.S. patent application Ser. No. 15/274,519, filed Sep. 23, 2016 and entitled "Data Analytics Services for Distributed Industrial Performance Monitoring"; U.S. patent application Ser. No. 15/274,233, filed Sep. 23, 2016 and entitled "Distributed Industrial Performance Monitoring and Analytics"; and U.S. patent application Ser. No. 15/332 751, filed concurrently herewith and entitled "Secured Process Control Communications", the entire disclosures of which are hereby incorporated by reference herein.

TECHNICAL FIELD

The present disclosure relates generally to process plants and to process control systems, and more particularly, to detecting conditions of devices within the process plant by analyzing time-series data.

BACKGROUND

Distributed process control systems, like those used in chemical, petroleum or other process plants, typically include one or more process controllers communicatively coupled to one or more field devices via I/O cards or devices, analog, digital or combined analog/digital buses, and/or a wireless communication link or network. The field devices, which may be, for example, valves, valve positioners, actuators, switches and transmitters (e.g., temperature, pressure, level and flow rate sensors), are located within the process environment and generally perform physical or process control functions such as opening or closing valves, measuring process parameters such as pressure, temperature, etc., and the like to control one or more process executing within the process plant or system. Smart field devices, such as the field devices conforming to the well-known Fieldbus protocol, may also perform control calculations, alarming functions, and other control functions commonly implemented within the controller. The process controllers, which are also typically located within the plant environment, receive signals indicative of process measurements made by the field devices and/or other information pertaining to the field devices, e.g., via a respective I/O card or device, and execute a controller application that runs, for example, different control modules which make process control decisions, generate control signals based on the received information and coordinate with the control modules or blocks being performed in the field devices, such as HART®, WirelessHART®, and FOUNDATION® Fieldbus field devices. The control modules in the controller send the control signals over the communication lines or links to the field devices to thereby control the operation of at least a portion of the process plant or system. As utilized herein, field devices, I/O cards or devices, and controllers are generally referred to as "process devices" or "process control devices."

Information from the field devices and the controller is usually made available over a data highway to one or more other hardware devices, such as operator workstations, personal computers or computing devices, data historians, report generators, centralized databases, or other centralized administrative computing devices that are typically placed in control rooms or other locations away from the harsher plant environment. Each of these hardware devices typically is centralized across the process plant or across a portion of the process plant. These hardware devices run applications that may, for example, enable an operator to perform functions with respect to controlling a process and/or operating the process plant, such as changing settings of the process control routine, modifying the operation of the control modules within the controllers or the field devices, viewing the current state of the process, viewing alarms generated by field devices and controllers, simulating the operation of the process for the purpose of training personnel or testing the process control software, keeping and updating a configuration database, etc. The data highway utilized by the hardware devices, controllers and field devices may include a wired communication path, a wireless communication path, or a combination of wired and wireless communication paths.

As an example, the DeltaV™ control system, sold by Emerson Process Management, includes multiple applications stored within and executed by different devices located at diverse places within a process plant. A configuration application, which resides in one or more workstations or computing devices, enables users to create or change process control modules and download these process control modules via a data highway to dedicated distributed controllers. Typically, these control modules are made up of communicatively interconnected function blocks, which are objects in an object oriented programming protocol that perform functions within the control scheme based on inputs thereto and that provide outputs to other function blocks within the control scheme. The configuration application may also allow a configuration designer to create or change operator interfaces which are used by a viewing application to display data to an operator and to enable the operator to change settings, such as set points, within the process control routines. Each dedicated controller and, in some cases, one or more field devices, stores and executes a respective controller application that runs the control modules assigned and downloaded thereto to implement actual process control functionality. The viewing applications, which may be executed on one or more operator workstations (or on one or more remote computing devices in communicative connection with the operator workstations and the data highway), receive data from the controller application via the data highway and display this data to process control system designers, operators, or users using the user interfaces, and may provide any of a number of different views, such as an operator's view, an engineer's view, a technician's view, etc. A data historian application is typically stored in and executed by a data historian device that collects and stores some or all of the data provided across the data highway while a configuration database application may run in a still further computer attached to the data highway to store the current process control routine configuration and data associated therewith. Alternatively, the configuration database may be located in the same workstation as the configuration application.

Generally speaking, a process control system of a process plant includes field devices, controllers, workstations, and other devices that are interconnected by a set of layered networks and buses. The process control system may, be in turn, be connected with various business and external networks, e.g., to reduce manufacturing and operational costs, enhance productivity and efficiencies, provide timely access to process control and/or process plant information, etc. On the other hand, the interconnection of process plants and/or process control systems to enterprise and/or external networks and systems increases the risk of cyber intrusions and/or malicious cyber-attacks that may arise from expected vulnerabilities in commercial systems and applications, such as those used in enterprise and/or external networks. Cyber intrusions and malicious cyber-attacks of process plants, networks, and/or control systems may negatively affect the confidentiality, integrity, and/or availability of information assets, which, generally speaking, are vulnerabilities similar to those of general purpose computing networks. However, unlike general purpose computer networks, cyber intrusions of process plants, networks, and/or control systems may also lead to damage, destruction, and/or loss of not only plant equipment, product, and other physical assets, but also to the loss of human life. For example, a cyber intrusion may cause a process to become uncontrolled, and thereby produce explosions, fires, floods, exposure to hazardous materials, etc. Thus, securing communications related to process control plants and systems is of paramount importance.

FIG. 1 includes a block diagram 10 of example levels of security for a process control or industrial process system. The diagram 10 depicts interconnections between various components of the process control system, the process control system itself, and other systems and/or networks to which the process control system may communicatively connect, as well as layers or levels of security relating to communications in and between the process control system and the other systems/networks. The security levels provide a layered approach to security via segmentation or separation, and various levels are protected by one or more firewalls 12a, 12b, 12c to allow only authorized traffic between the different levels. In FIG. 1, the lower-numbered security levels are closer to the on-line process that is being controlled, while the higher-numbered security levels are more removed from the executing process. Accordingly, trust levels (e.g., a relative degree of trust that messages, packets, and other communications are safe) are the highest at the device level (Level 0), and trust levels are the lowest above the business network level (Level 5), e.g., on the public Internet. Using the Purdue Model for Control Hierarchy logical framework standardized by ISA (International Society of Automation) 95.01-IEC (International Electrotechnical Commission) 62264-1, process control systems generally fall into Levels 0-2, and manufacturing, corporate, and enterprise systems generally fall into Levels 3-5.

Examples of different functionalities at each of the different security levels are shown in FIG. 1. Typically, Level 0 includes field devices that have direct contact with the process, for example, sensors, valves, valve positioners, switches, transmitters, and other devices that perform physical and/or process control functions such as opening or closing valves, measuring process parameters such as pressure, temperature, etc., and the like. For clarity of illustration, example field devices are not shown in FIG. 1.

Level 1 includes controllers and other process control devices 15a-15d that provide basic control of real-time operations of the process, e.g., by receiving input from field devices, processing the input using control schemes, modules, or logic, and sending resultant output to other devices. For example, process control devices at Level 1 may include process controllers, programmable logic controllers (PLCs), Remote Terminal Units (RTUs), and the like. Generally, such process control devices are programmed and/or configured with respective control schemes. As shown in FIG. 1, the process control devices at Level 1 may include those that perform batch control 15a, discrete control 15b, continuous control 15c, hybrid control 15d, and/or other types of control.

Level 2 includes devices and equipment 18A-18D that provide production area supervisory control. For example, Level 2 may include alarming and/or alerting systems 18A, operator workstations 18C, other Human Machine Interfaces (HMIs) 18B, 18D, and the like. Generally, Level 2 devices and equipment may communicate with Level 1 devices 15A-15D, as well as with Level 3 devices and equipment, e.g., via one or more firewalls 12A, 12B.

Level 3 houses plant systems and/or networks, e.g., the devices, equipment, and systems 20A-20D that manage site/plant operations and control to produce or manufacture a desired end product. For example, Level 3 may include production systems 20A that are used for production control, reporting, scheduling, etc.; optimization systems 20B that are used for improving quality, productivity, efficiencies, etc.; historians 20C for historizing data generated by and/or indicative of the process plant; and/or engineering workstations or computing devices 20D used by personnel for design and development of control schemes and modules, operator workstation and/or HMI interfaces, etc.

Skipping to Level 5, Level 5 generally houses business, corporate, or enterprise systems and/or networks. Typically, such systems and/or networks manage the interfacing with systems outside of the enterprise. For example, an enterprise's VPN (Virtual Private Network), corporate or enterprise Internet access services, and/or other IT (Information Technology) infrastructure systems and applications may be found in Level 5.

Level 4, which may be viewed as an inward extension of Level 5, generally houses corporate or enterprise systems that are internal to the enterprise, such as email, intranet, site business planning and logistics, inventory, scheduling, and/or other corporate/enterprise systems and networks.

As shown in FIG. 1, Level 3 and Level 4 are separated by a demilitarized zone (DMZ) 22 to separate business or enterprise systems and/or networks from plant/process systems and/or networks, thereby minimizing the level of security risk to which a process plant is exposed. The DMZ 22 may include one or more respective firewalls 12C, and may house various devices, equipment, servers, and/or applications 25A-25F that communicate with plant-related devices, equipment, and applications at lower levels, and/or with enterprise-related devices, equipment, and applications at higher levels. For example, the DMZ 22 may house Terminal Services 25A, Patch Management 25B, one or more AV Servers 25C, one or more Historians 25d (which may be mirror historians), Web Services Operations 25E, and/or one or more Application Servers 25F, to name a few. Typically, for devices, equipment, and/or applications at levels above the DMZ 22, only those that are authorized to access the process plant and its control systems are required to connect to the devices, equipment, servers, and/or applications 25A-25F which, in turn, maintain separate connections to the lower levels, thereby protecting the process plant and control system from attacks from the enterprise (and higher) systems and/or networks.

Turning now to a brief discussion of remote services, remote services are becoming more and more commonly used by different users and systems. For example, the Remote Desktop Services product provided by the Microsoft Windows® operating system enables users to access session-based desktops, virtual machine-based desktops, or and/or other applications in a data center from a corporate network and/or from the Internet. The QuickBooks® Online product provided by Intuit® enables users to perform accounting functions such as cash flow management, issuing invoices, and making payments online via the Internet. Generally speaking, remote services are provided by one or more applications that execute remotely from the system or user that accesses the remote service. For example, the one or more applications execute and manage data at a remote bank of servers, in the cloud, etc., and are accessed via one or more private and/or public networks, such as an enterprise network and/or the public Internet.

SUMMARY

Techniques, systems, apparatuses, components, devices, and methods for detecting conditions of devices within the process plant using time-series analytics are disclosed herein. Said techniques, systems, apparatuses, components, devices, and methods may apply to industrial process control systems, environments, and/or plants, which are interchangeably referred to herein as "industrial control," "process control," or "process" systems, environments, and/or plants. Typically, such systems and plants provide control, in a distributed manner, of one or more processes that operate to manufacture, refine, transform, generate, or produce physical materials or products.

To detect conditions at or of process control devices, one or more computing devices receive process parameter values over several instances in time for process parameters corresponding to a process plant entity. A process plant entity includes a device within a process plant which performs a physical function to control the process, such as a valve, a tank, a mixer, a pump, a heat exchanger, etc. The process plant entity may include a controller and/or an I/O device, in some cases. Generally speaking, the process plant entity may contain, transform, generate, or transfer physical materials in the process plant.

Process parameters include set points or measured values within the process plant of materials flowing through the process plant or of devices which perform physical functions to control the process (e.g., valve parameters, field device parameters, controller parameters, etc.). For example, process parameters include a temperature, pressure, flow rate, mass, volume, density, area, etc. of a material flowing through the process plant or set points thereof. Process parameters also include a drive signal, travel, pressure, temperature, etc. of a device which performs physical functions to control the process (e.g., a valve) or set points thereof.

The process parameter values are received in a secure manner, such as via a data diode (as described in more detail below), by using firewalls, encryption techniques, or any other suitable security mechanisms. The computing device (s) then detects or identifies a condition occurring at the process plant entity (e.g., a performance monitoring metric, an error, a leak, dead band, dead time, mechanical wear, etc.) by applying rules or using machine learning techniques on the received, time-series data.

In an example, the computing device performs statistical calculations on each process parameter to determine an average value for the process parameter, a standard deviation, a moving average over a predetermined time period, a decaying average over the predetermined time period, maximum/minimum values for the process parameter, an amplitude, phase, and/or frequency of a wave corresponding to the process parameter values over time, etc. The statistical measures are then compared to a statistical model generated using historical process parameter values for process plant entities and the resulting conditions of the process plant entities are detected or identified.

A statistical model may be, for example, a decision tree. The computing device may generate a decision tree made up of nodes, branches, and leaves, where each node represents a test on a statistical measure, each branch represents the outcome of the test, and each leaf represents a likelihood that the process plant entity will experience a condition. By comparing the calculated statistical measures of the subject process control entity to the decision tree, the computing device determines that a particular condition is occurring or is present at the process plant entity, such as excessive dead band (e.g., dead band which exceeds an allowable threshold). The computing device transmits an indication of the detected condition to a user interface device, such as an operator workstation, to alert an operator to the condition. For example, when a valve in the process control system experiences excessive dead band, the operator is alerted of this condition and can examine the valve to address the issue.

In some scenarios, such as when the process plant entity is a valve, the computing device determines the mode of operation for the process plant entity or valve (e.g., full stroke cycling, continuous throttling, periodic throttling, etc.) based on the received process parameter data or valve data. For example, the mode of operation for a valve is determined based on received process parameter values for process parameters corresponding to the valve, e.g., is determined based on received valve parameter values corresponding to the valve for one or more valve parameters. The computing device applies a set of rules to the process parameter values and/or uses machine learning techniques to determine the mode of operation of the valve.

Based on the determined mode of operation of the valve, the computing device compares statistical measures for the valve (which are determined from the valve data) to a statistical model specifically generated based on valves operating in the determined mode. In some embodiments, the computing device generates the one or more mode-specific statistical models. For example, the computing device may generate a statistical model for detecting valve conditions using historical process parameter values from valves operating in the full stroke cycling mode. The computing device may generate another statistical model for detecting valve conditions using historical process parameter values from valves operating in the continuous throttling mode, and a third statistical model for detecting valve conditions using historical process parameter values from valves operating in the periodic throttling model. Using the statistical model for the determined mode of operation and the received valve data, the computing device detects or identifies a condition occurring at the valve.

Also in some scenarios, such as when the process plant entity is a valve, the computing device compares valve data (valve or process parameter values) for multiple valves in the same process plant, enterprise, industry, or across all industries. The computing device then determines the health of the subject valve relative to the other valves and transmits an indication of the comparison (e.g., a relative health indicator) to a user interface device for display to an operator or to another computing device or application. For example, the user interface device displays a rankings list of each of the valves or presents valve data side-by-side for each of the valves in a graphical depiction. Additionally, the comparison is used as a further measure of the condition of the valve. For example, when the valve data is compared to a statistical model generated using historical process parameter values, the computing device may determine that the valve is experiencing excessive dead time (e.g., dead time above an allowable threshold). However, when the valve is compared to all other valves in the same industry, the computing device may determine that the dead time the valve is experiencing is about average within the industry and therefore the dead time is within an acceptable range.

In an embodiment, a method for detecting a condition of a process plant entity by using data that is securely transported from a process plant to a cloud computing system is disclosed. The method includes receiving, at the cloud computing system, data generated by one or more devices of the process plant while the process plant is operating to control an industrial process. The data is secured for transmission from the one or more devices to the cloud computing system via a data diode that is configured to prevent two-way communications between a network of the process plant and a network of the cloud computing system. Additionally, the method includes analyzing, at the cloud computing system, the data, thereby detecting a condition of a process plant entity that performs a physical function to control the industrial process in the process plant. The process plant entity corresponds to or is associated with the one or more devices. For example, the process plant entity may be a control loop or a device included in the control loop, such as a valve or other type of field device, and the one or more devices may include a communication node such as a gateway. In another example, the one or more devices are included in the process plant entity. The method further includes transmitting an indication of the condition of the process plant entity to a user interface device, e.g., to alert an operator to the condition.

In an embodiment, a system for detecting a condition of a process plant entity of a process plant is disclosed. The system includes one or more devices corresponding to a process plant entity disposed in the process plant, where the process plant entity performs a physical function to control an industrial process. For example, the process plant entity may be a control loop or a device included in the control loop, such as a valve or other type of field device. The system further includes a data diode communicatively connecting the one or more devices to one or more computing devices, where the data diode is configured to prevent two-way communications between a network of the process plant and the one or more computing devices.

The one or more computing devices of the system comprise one or more processors; a communication unit; and one or more non-transitory computer-readable media coupled to the one or more processors and to the communication unit. The one or more non-transitory computer-readable media store thereon (or are particularly configured with) instructions that, when executed by the one or more processors, cause the computing device to (i) receive, via the data diode and the communication unit, data generated by the one or more devices of the process plant while the process plant is on-line, where the data secured for transmission from the one or more devices to the computing device via the data diode, (ii) analyze the data to detect a condition of the process plant entity, and (iii) transmit, via the communication unit to a user interface device, an indication of the condition for the process plant entity to alert an operator to the condition.

DETAILED DESCRIPTION

As discussed above, process plant data that is used to detect a condition at or of a process plant entity is received at a computing device in a secure manner. Once the process plant data is received in the secure manner, process plant data corresponding to a process plant entity is analyzed to detect or identify a condition occurring at or of the process plant entity. The process plant data may be analyzed by applying a set of rules to process parameter values included in the process plant data or by using various machine learning techniques described in more detail below, for example. An indication of the condition is transmitted to a user interface device to alert an operator of the condition, and/or is provided to an application or service corresponding to the process plant.

The novel systems, components, apparatuses, methods, and techniques described herein are directed to performing time-series analytics of process plant data to detect a condition occurring at or of a process plant entity. The process plant data is received in a secure manner, which is described in further detail below with reference to FIGS. 1-3. Additionally, the time-series analysis of the process plant data is described in further detail below with reference to FIGS. 4-8.

Securing process control plants and systems against cyber intrusions and malicious cyber-attacks typically utilizes a layered or leveled security hierarchy, with at least some of the layers or levels secured by using firewalls and other security mechanisms. For example, as previously discussed with respect to FIG. 1, process plant systems, networks, and devices at Levels 0-3 may be protected against threats from enterprise networks at Levels 4-5, and/or from any external networks higher than Level 5 exploiting the enterprise networks, by using a DMZ 22 and one or more firewalls 12c. However, as and more services and applications that operate on process plant data are moved to execute remotely, e.g., on networks and systems outside of the process plant (e.g., at Levels 4 and/or 5 within the enterprise or business), and/or even on networks and systems that are external to the enterprise or business (e.g., above Level 5, via the Internet or other public network), stronger techniques for preventing process plant systems, networks, and devices from being compromised are needed.

Figure 2:
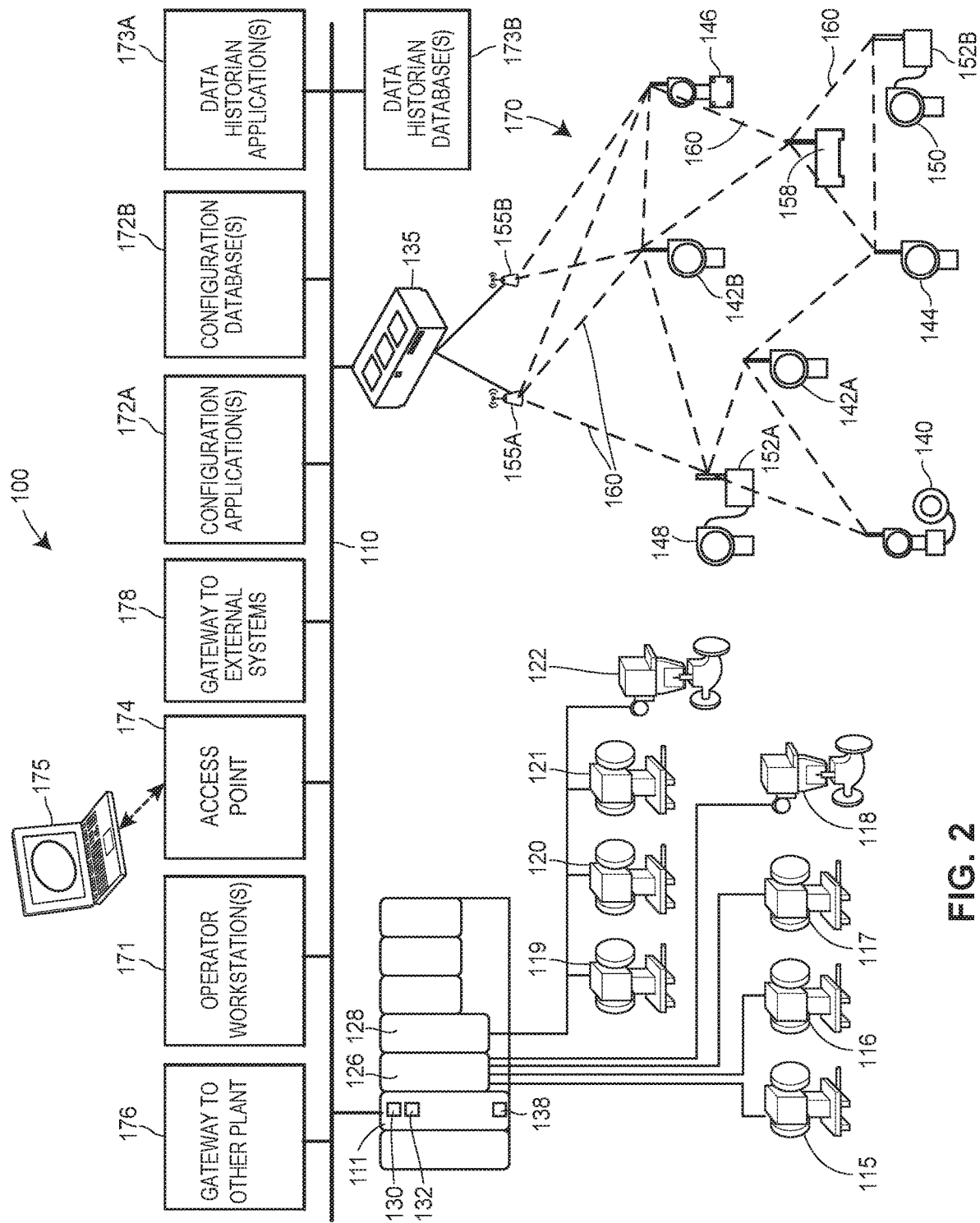
FIG. 2 is a block diagram of an example process plant or process control system, that illustrates, inter alia, interconnections between various example components of the process control system, the process control system itself, and other example systems and/or networks.

To illustrate, FIG. 2 is a block diagram of an example process plant 100 which may be secured utilizing any one or more of the novel security techniques described herein. The process plant 100 (which is also interchangeably referred to herein as a process control system 100 or process control environment 100) includes one or more process controllers that receive signals indicative of process measurements made by field devices, process this information to implement a control routine, and generate control signals that are sent over wired or wireless process control communication links or networks to other field devices to control the operation of a process in the plant 100. Typically, at least one field device performs a physical function (e.g., opening or closing a valve, increasing or decreasing a temperature, taking a measurement, sensing a condition, etc.) to control the operation of a process. Some types of field devices communicate with controllers by using I/O devices. Process controllers, field devices, and I/O devices may be wired or wireless, and any number and combination of wired and wireless process controllers, field devices and I/O devices may be included in the process plant environment or system 100.

For example, FIG. 2 illustrates a process controller 111 that is communicatively connected to wired field devices 115-122 via input/output (I/O) cards 126 and 128, and that is communicatively connected to wireless field devices 140-146 via a wireless gateway 135 and a process control data highway or backbone 110. The process control data highway 110 may include one or more wired and/or wireless communication links, and may be implemented using any desired or suitable or communication protocol such as, for example, an Ethernet protocol. In some configurations (not shown), the controller 111 may be communicatively connected to the wireless gateway 135 using one or more communications networks other than the backbone 110, such as by using any number of other wired or wireless communication links that support one or more communication protocols, e.g., Wi-Fi or other IEEE 802.11 compliant wireless local area network protocol, mobile communication protocol (e.g., WiMAX, LTE, or other ITU-R compatible protocol), Bluetooth®, HART®, WirelessHART®, Profibus, FOUNDATION® Fieldbus, etc.

The controller 111, which may be, by way of example, the DeltaV™ controller sold by Emerson Process Management, may operate to implement a batch process or a continuous process using at least some of the field devices 115-122 and 140-146. In an embodiment, in addition to being communicatively connected to the process control data highway 110, the controller 111 is also communicatively connected to at least some of the field devices 115-122 and 140-146 using any desired hardware and software associated with, for example, standard 4-20 mA devices, I/O cards 126, 128, and/or any smart communication protocol such as the FOUNDATION® Fieldbus protocol, the HART® protocol, the WirelessHART® protocol, etc. In FIG. 2, the controller 111, the field devices 115-122 and the I/O cards 126, 128 are wired devices, and the field devices 140-146 are wireless field devices. Of course, the wired field devices 115-122 and wireless field devices 140-146 could conform to any other desired standard(s) or protocols, such as any wired or wireless protocols, including any standards or protocols developed in the future.

The process controller 111 of FIG. 2 includes a processor 130 that implements or oversees one or more process control routines 138 (e.g., that are stored in a memory 132). The processor 130 is configured to communicate with the field devices 115-122 and 140-146 and with other nodes communicatively connected to the controller 111. It should be noted that any control routines or modules described herein may have parts thereof implemented or executed by different controllers or other devices if so desired Likewise, the control routines or modules 138 described herein which are to be implemented within the process control system 100 may take any form, including software, firmware, hardware, etc. Control routines may be implemented in any desired software format, such as using object oriented programming, ladder logic, sequential function charts, function block diagrams, or using any other software programming language or design paradigm. The control routines 138 may be stored in any desired type of memory 132, such as random access memory (RAM), or read only memory (ROM) Likewise, the control routines 138 may be hard-coded into, for example, one or more EPROMs, EEPROMs, application specific integrated circuits (ASICs), or any other hardware or firmware elements. Thus, the controller 111 may be configured to implement a control strategy or control routine in any desired manner.

The controller 111 implements a control strategy using what are commonly referred to as function blocks, where each function block is an object or other part (e.g., a subroutine) of an overall control routine and operates in conjunction with other function blocks (via communications called links) to implement process control loops within the process control system 100. Control based function blocks typically perform one of an input function, such as that associated with a transmitter, a sensor or other process parameter measurement device, a control function, such as that associated with a control routine that performs PID, fuzzy logic, etc. control, or an output function which controls the operation of some device, such as a valve, to perform some physical function within the process control system 100. Of course, hybrid and other types of function blocks exist. Function blocks may be stored in and executed by the controller 111, which is typically the case when these function blocks are used for, or are associated with standard 4-20 mA devices and some types of smart field devices such as HART® devices, or may be stored in and implemented by the field devices themselves, which can be the case with FOUNDATION® Fieldbus devices. The controller 111 may include one or more control routines 138 that may implement one or more control loops which are performed by executing one or more of the function blocks.

The wired field devices 115-122 may be any types of devices, such as sensors, valves, transmitters, positioners, etc., while the I/O cards 126 and 128 may be any types of I/O devices conforming to any desired communication or controller protocol. In FIG. 2, the field devices 115-118 are standard 4-20 mA devices or HART® devices that communicate over analog lines or combined analog and digital lines to the I/O card 126, while the field devices 119-122 are smart devices, such as FOUNDATION® Fieldbus field devices, that communicate over a digital bus to the I/O card 128 using a FOUNDATION® Fieldbus communications protocol. In some embodiments, though, at least some of the wired field devices 115, 116 and 118-121 and/or at least some of the I/O cards 126, 128 additionally or alternatively communicate with the controller 111 using the process control data highway 110 and/or by using other suitable control system protocols (e.g., Profibus, DeviceNet, Foundation Fieldbus, ControlNet, Modbus, HART, etc.).

In FIG. 2, the wireless field devices 140-146 communicate via a wireless process control communication network 170 using a wireless protocol, such as the WirelessHART® protocol. Such wireless field devices 140-146 may directly communicate with one or more other devices or nodes of the wireless network 170 that are also configured to communicate wirelessly (using the wireless protocol or another wireless protocol, for example). To communicate with one or more other nodes that are not configured to communicate wirelessly, the wireless field devices 140-146 may utilize a wireless gateway 135 connected to the process control data highway 110 or to another process control communications network. The wireless gateway 135 provides access to various wireless devices 140-158 of the wireless communications network 170. In particular, the wireless gateway 135 provides communicative coupling between the wireless devices 140-158, the wired devices 115-128, and/or other nodes or devices of the process control plant 100. For example, the wireless gateway 135 may provide communicative coupling by using the process control data highway 110 and/or by using one or more other communications networks of the process plant 100.

Similar to the wired field devices 115-122, the wireless field devices 140-146 of the wireless network 170 perform physical control functions within the process plant 100, e.g., opening or closing valves, or taking measurements of process parameters. The wireless field devices 140-146, however, are configured to communicate using the wireless protocol of the network 170. As such, the wireless field devices 140-146, the wireless gateway 135, and other wireless nodes 152-158 of the wireless network 170 are producers and consumers of wireless communication packets.

In some configurations of the process plant 100, the wireless network 170 includes non-wireless devices. For example, in FIG. 2, a field device 148 of FIG. 2 is a legacy 4-20 mA device and a field device 150 is a wired HART® device. To communicate within the network 170, the field devices 148 and 150 are connected to the wireless communications network 170 via a wireless adaptor 152A, 152B. The wireless adaptors 152A, 152B support a wireless protocol, such as WirelessHART, and may also support one or more other communication protocols such as Foundation® Fieldbus, PROFIBUS, DeviceNet, etc. Additionally, in some configurations, the wireless network 170 includes one or more network access points 155A, 155B, which may be separate physical devices in wired communication with the wireless gateway 135 or may be provided with the wireless gateway 135 as an integral device. The wireless network 170 may also include one or more routers 158 to forward packets from one wireless device to another wireless device within the wireless communications network 170. In FIG. 2, the wireless devices 140-146 and 152-158 communicate with each other and with the wireless gateway 135 over wireless links 160 of the wireless communications network 170, and/or via the process control data highway 110.

In FIG. 2, the process control system 100 includes one or more operator workstations 171 that are communicatively connected to the data highway 110. Via the operator workstations 171, operators may view and monitor run-time operations of the process plant 100, as well as take any diagnostic, corrective, maintenance, and/or other actions that may be required. At least some of the operator workstations 171 may be located at various, protected areas in or near the plant 100, and in some situations, at least some of the operator workstations 171 may be remotely located, but nonetheless in communicative connection with the plant 100. Operator workstations 171 may be wired or wireless computing devices.

The example process control system 100 is further illustrated as including a configuration application 172A and configuration database 172B, each of which is also communicatively connected to the data highway 110. As discussed above, various instances of the configuration application 172A may execute on one or more computing devices (not shown) to enable users to create or change process control modules and download these modules via the data highway 110 to the controllers 111, as well as enable users to create or change operator interfaces via which in operator is able to view data and change data settings within process control routines. The configuration database 172B stores the created (e.g., configured) modules and/or operator interfaces. Generally, the configuration application 172A and configuration database 172B are centralized and have a unitary logical appearance to the process control system 100, although multiple instances of the configuration application 172A may execute simultaneously within the process control system 100, and the configuration database 172B may be implemented across multiple physical data storage devices. Accordingly, the configuration application 172A, configuration database 172B, and user interfaces thereto (not shown) comprise a configuration or development system 172 for control and/or display modules. Typically, but not necessarily, the user interfaces for the configuration system 172 are different than the operator workstations 171, as the user interfaces for the configuration system 172 are utilized by configuration and development engineers irrespective of whether or not the plant 100 is operating in real-time, whereas the operator workstations 171 are utilized by operators during real-time operations of the process plant 100 (also referred to interchangeably here as "run-time" operations of the process plant 100).

The example process control system 100 includes a data historian application 173A and data historian database 173B, each of which is also communicatively connected to the data highway 110. The data historian application 173A operates to collect some or all of the data provided across the data highway 110, and to historize or store the data in the historian database 173B for long term storage. Similar to the configuration application 172A and configuration database 172B, the data historian application 173A and historian database 173B are centralized and have a unitary logical appearance to the process control system 100, although multiple instances of a data historian application 173A may execute simultaneously within the process control system 100, and the data historian 173B may be implemented across multiple physical data storage devices.

In some configurations, the process control system 100 includes one or more other wireless access points 174 that communicate with other devices using other wireless protocols, such as Wi-Fi or other IEEE 802.11 compliant wireless local area network protocols, mobile communication protocols such as WiMAX (Worldwide Interoperability for Microwave Access), LTE (Long Term Evolution) or other ITU-R (International Telecommunication Union Radiocommunication Sector) compatible protocols, short-wavelength radio communications such as near field communications (NFC) and Bluetooth, or other wireless communication protocols. Typically, such wireless access points 174 allow handheld or other portable computing devices (e.g., user interface devices 175) to communicate over a respective wireless process control communication network that is different from the wireless network 170 and that supports a different wireless protocol than the wireless network 170. For example, a wireless or portable user interface device 175 may be a mobile workstation or diagnostic test equipment that is utilized by an operator within the process plant 100 (e.g., an instance of one of the operator workstations 171). In some scenarios, in addition to portable computing devices, one or more process control devices (e.g., controller 111, field devices 115-122, or wireless devices 135, 140-158) also communicate using the wireless protocol supported by the access points 174.

In some configurations, the process control system 100 includes one or more gateways 176, 178 to systems that are external to the immediate process control system 100. Typically, such systems are customers or suppliers of information generated or operated on by the process control system 100. For example, the process control plant 100 may include a gateway node 176 to communicatively connect the immediate process plant 100 with another process plant. Additionally or alternatively, the process control plant 100 may include a gateway node 178 to communicatively connect the immediate process plant 100 with an external public or private system, such as a laboratory system (e.g., Laboratory Information Management System or LIMS), an operator rounds database, a materials handling system, a maintenance management system, a product inventory control system, a production scheduling system, a weather data system, a shipping and handling system, a packaging system, the Internet, another provider's process control system, or other external systems.

It is noted that although FIG. 2 only illustrates a single controller 111 with a finite number of field devices 115-122 and 140-146, wireless gateways 35, wireless adaptors 152, access points 155, routers 1158, and wireless process control communications networks 170 included in the example process plant 100, this is only an illustrative and non-limiting embodiment. Any number of controllers 111 may be included in the process control plant or system 100, and any of the controllers 111 may communicate with any number of wired or wireless devices and networks 115-122, 140-146, 135, 152, 155, 158 and 170 to control a process in the plant 100.

Figure 3:
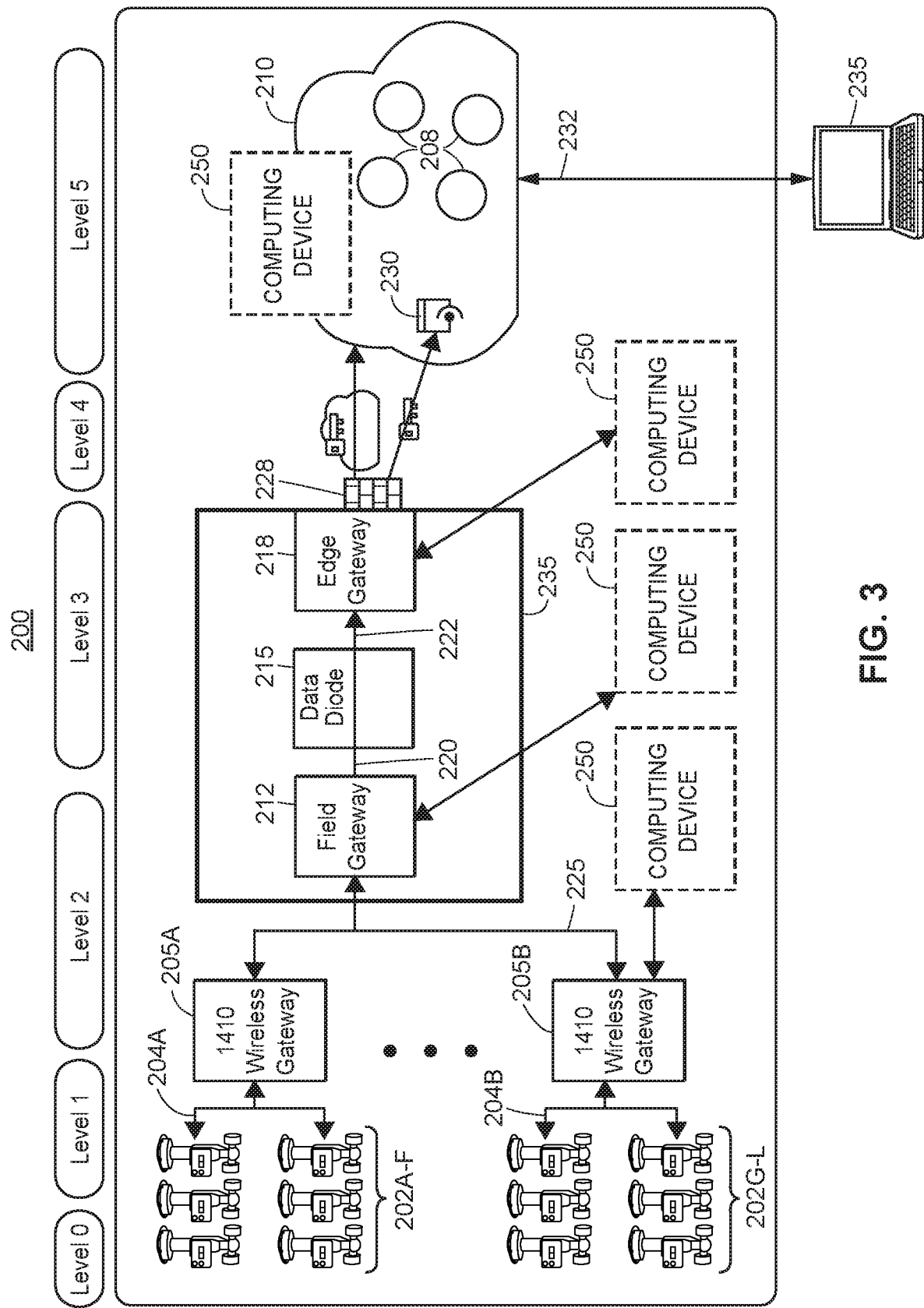
FIG. 3 is a block diagram of an example security architecture for a process plant or process control system.

FIG. 3 includes a block diagram of an example security architecture 200 for the process plant 100. For reference, the various levels of security 0-5 from FIG. 1 are depicted across the top of FIG. 3 to indicate in which security levels various portions of the security architecture 200 may be included.

Figure 1:
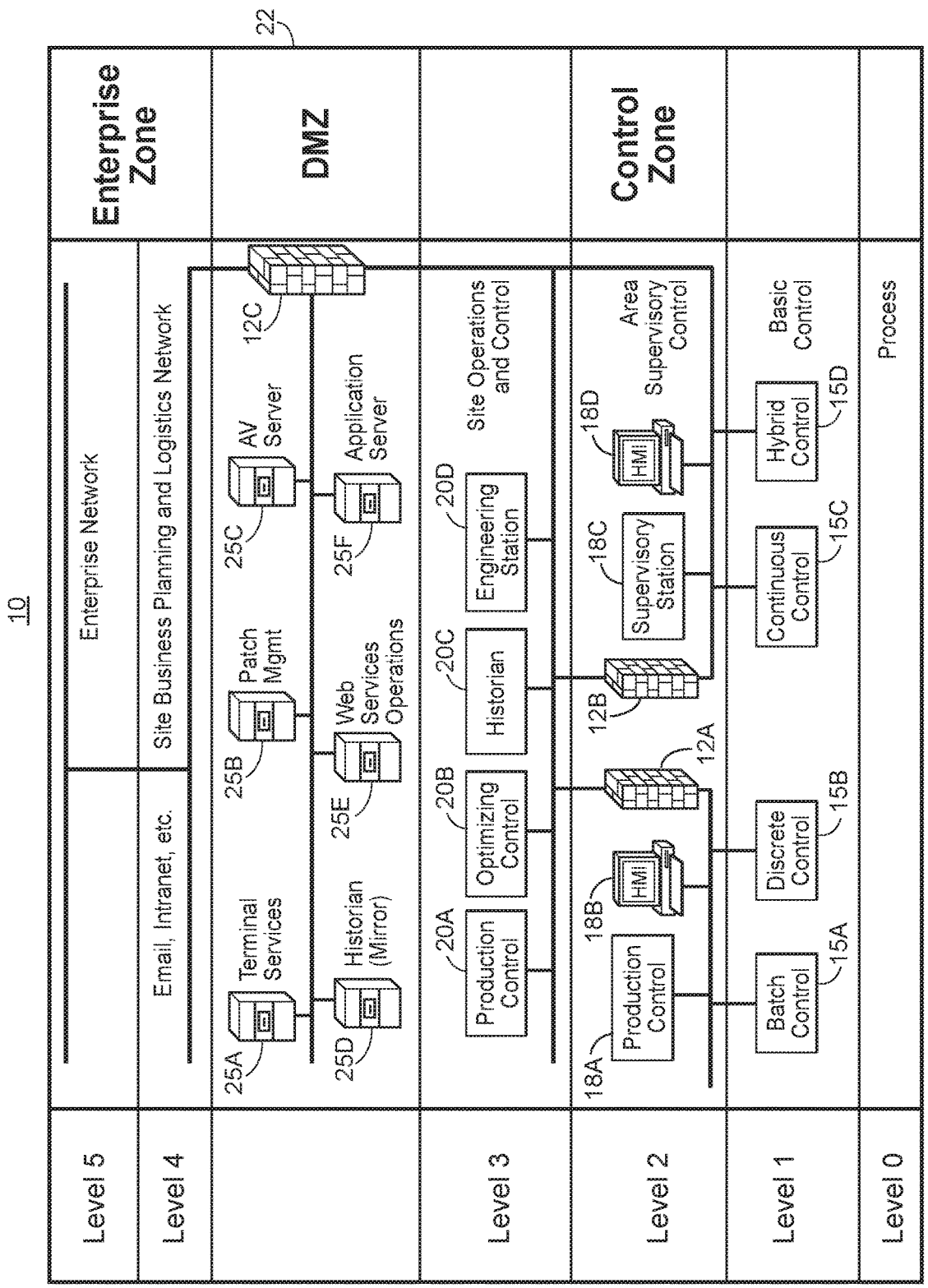
FIG. 1 includes a block diagram of example levels of security for a process control or industrial process system, including, inter alia, interconnections between various example components of the process control system, the process control system itself, and other example systems and/or networks.

As shown in FIG. 3, one or more devices 202 are communicatively connected to one or more wireless gateways 205A, 205B which, for example, may be instances of the wireless gateway 135 of FIG. 1. As previously discussed, the wireless gateways 205A, 205B may be located at Security Level 1 and/or Security Level 2, e.g., within the process plant 100 itself. The communicative connections between the gateways 205A, 205B and the devices 202 are denoted by the references 204A, 204B.

The set of devices 202 is illustrated as being at security Level 0 of the process plant 100, and is depicted as comprising a finite number of wireless field devices. However, it is understood that the concepts and features described herein with respect to the devices 202 may be easily applied to any number of field devices of the process plant 100, as well as to any types of field devices. For example, the field devices 202 may include one or more wired field devices 115-122 that are communicatively connected to the wireless gateways 205A, 205B via one or more wired communication networks of the process plant 100, and/or the field devices 202 may include wired field devices 148, 150 that are coupled to wireless adaptors 152A, 152B.

Further, it is understood that the set of devices 202 is not limited to only field devices, but may additionally or alternatively include any device or component within the process plant 100 that generates data as a result of the process plant 100 controlling the on-line process. For example, the set of devices 202 may include a diagnostic device or component that generates diagnostic data, a network routing device or component that transmits information between various components of the process plant 100, and the like. Indeed, any of the components shown in FIG. 2 (e.g., components 111, 115-122, 126, 128, 135, 140-146, 152, 155, 158, 160, 170, 171-176, 178) and other components that are not shown may be a device that generates data for delivery to the remote system 210. As such, the set of devices 202 is referred to interchangeably herein as "data sources 202" or "data source devices 202."

FIG. 3 further illustrates a set of remote applications or services 208 that may be utilized for the process plant 100 and/or that the process plant 100 utilizes. The set of remote applications or services 208 may execute or be hosted at one or more remote systems 210, and the set of remote applications/services 208 are considered to be at Security Level 5 or above, generally speaking. At least some of the applications or services 208 operate in real-time on real-time data as the real-time data is generated by the process plant 100 and received by the applications or services 208. Other applications or services 208 may operate or execute on process plant-generated data with less stringent timing requirements. Examples of applications/services 208 that may execute or be hosted at the remote system 210 and that are consumers of data generated by the process plant 100 include applications that monitor and/or sense conditions and/or events occurring at the process plant 100, and applications or services that monitor at least a portion of the on-line process itself as it is executing at the process plant 100. Other examples of applications/services 208 include descriptive and/or prescriptive analytics, which may operate on data generated by the process plant 100 and, in some cases, may operate on knowledge gleaned or discovered from analyzing the process plant-generated data, as well as on data generated by and received from other process plants. Still other examples of applications/services 208 include one or more routines that implement prescriptive functions and/or changes that are to be implemented back into the process plant 100, e.g., as a result of another service or application. Some examples of applications and services 208 are described in U.S. patent application Ser. No. 15/274,519, filed Sep. 23, 2016 and entitled "Data Analytics Services for Distributed Industrial Performance Monitoring," and in U.S. patent application Ser. No. 15/274,233, filed Sep. 23, 2016 and entitled "Distributed Industrial Performance Monitoring and Analytics," the entire disclosures of which are hereby incorporated by reference. Other examples of applications and services 208 operate on knowledge gleaned from analyzing historical data generated by the process plant and/or other process plants or from comparing data for a process plant entity to process plant entities of a same or similar type, as described in more detail below.

The one or more remote systems 210 may be implemented in any desired manner, such as by a remote bank of networked servers, one or more cloud computing systems, one or more networks, etc. For ease of discussion, the one or more remote systems 210 are referred to herein using the singular tense, i.e., "remote system 210," although it is understood that said term may refer to one system, more than one system, or any number of systems. In some scenarios, one or more computing devices 250 which are configured to analyze process plant data may be included within the remote system 210. For example, one or more remote applications or services 208 may execute on the one or more computing devices 250 to analyze process plant data generated by the process plant 100. It is noted that the one or more computing devices 250 is referred to herein in the singular tense, e.g., "the computing device 250", however, this is for ease of reading and not limitation purposes, the one or more computing devices 250 may include one, two, or any number of computing devices.

Generally speaking, the security architecture 200 provides end-to-end security from the field environment of the process plant 100 in which devices 202 are installed and operate, to the remote system 210 providing applications and/or services 208 that consume and operate on the data generated by the process plant 100. As such, data that is generated by the devices 202 and other components of the process plant 100 is able to be securely transported to the remote system 210 for use by the remote applications/services 208 while protecting the plant 100 from cyber-attacks, intrusions, and/or other malicious events. In particular, the security architecture 200 includes a field gateway 212, a data diode 215, and an edge gateway 218 disposed between the process plant 100 (e.g., between the wireless gateways 205A, 205B of the process plant 100) and the remote system 210. Typically, but not necessarily, the field gateway 212, the data diode 215, and the edge gateway 218 are included at Security Levels 2-5.

A key aspect of the security architecture 200 is the data diode 215. The data diode 215 is a component that is implemented in hardware, firmware and/or software and is particularly configured to prevent two-way communications between the process plant 100 and the remote system 210. That is, the data diode 215 allows data traffic to egress from the process control system 100 to the remote system 210, and prevents data traffic (e.g., that is transmitted or sent from the remote system 210 or other systems) from ingressing into the process control system 100.

Accordingly, the data diode 215 includes at least one input port 220 that is communicatively connected to the field gateway 212 and at least one output port 222 that is communicatively connected to the edge gateway 218. The data diode 215 also includes a fiber optic or communication link of any other suitable technology that connects its input port 222 to its output port 222. To prevent data traffic from flowing to (e.g., ingressing into) the process control system 100, in an example implementation, the data diode 215 excludes or omits an input port to receive data from the edge gateway 218 (or other component at a higher security level), and/or excludes or omits an output port to transmit data to the field gateway 212 (or other component at a lower security level). In an additional or alternative implementation, the data diode 215 excludes, omits, and/or disables transceivers that otherwise would allow data to flow from the output port 222 to the input port 220, and/or excludes a physical communication path for data to flow from the output port 222 to the input port 220. Still additionally or alternatively, the data diode 215 may support only unidirectional data flow from the input port 220 to the output port 222 via software, e.g., by dropping or blocking any messages received at the output port 222 from the edge gateway 218 (or higher security level component), and/or by dropping or blocking any messages addressed to the field gateway 212 (or lower security level component).

Data that is egressed from the process plant 100 and transmitted across the data diode 215 from the input port 220 to the output port 222 may be further secured across the data diode 215 by encryption. In an example, the field gateway 212 encrypts data and delivers encrypted data to the input port 220. In another example, the data diode 215 receives data traffic from the field gateway 212, and the data diode 215 encrypts the received data traffic prior to transiting the data to the output port 222. The data traffic that is encrypted and transported across the data diode 215 may be UDP (User Datagram Protocol) data traffic, in an example, and may be JSON data traffic or some other general purpose communication format, in another example.

The field gateway 212 communicatively connects the lower security side of the data diode 215 to the process control plant 100. As shown in FIG. 3, the field gateway 212 is communicatively connected to the wireless gateways 205A, 205B that are disposed within the field environment of the process plant 100, and that are communicatively connected to one or more devices or data sources 202. As previously discussed, the devices or data sources 202 and the wireless gateways 205A, 205B may communicate using the WirelessHART industrial protocol or other suitable wireless protocol that is structured to provide secured communications via one or more security mechanisms. For instance, the WirelessHART industrial protocol provides 128-bit AES encryption, and the communication paths 204A, 204B may be secured accordingly.

Additionally, the communicative connection 225 between the wireless gateways 205A, 205B and the field gateway 212 is respectively secured using the same or a different security mechanism as utilized for the communicative connections 204A, 204B. In an example, the communicative connection 225 is secured by a TLS (Transport Layer Security) wrapper. For instance, the wireless gateways 205A, 205B generate packets in the HART-IP format which are secured by a TLS wrapper for transit to the field gateway 212.

Thus, as described above, in an embodiment, data or packets generated by the devices 202 may be secured for transit 204A, 204B to the wireless gateways 205A, 205B using a first security mechanism, and subsequently secured for transit 225 from the wireless gateways 205A, 205B to the field gateway 212 using a second security mechanism, and still subsequently secured for transit across the data diode 215 using a third security mechanism.

Now turning to the higher security side of the data diode 215, data traffic egressing from the data diode 215 may be secured for transit to the edge gateway 218, if desired, by using a fourth security mechanism, or by using one of the security mechanisms employed on the lower security side of the data diode 215 discussed above. Additionally or alternatively, and as depicted in FIG. 3, the edge gateway 218 may be protected by a firewall 228, which may be the firewall 12C of FIG. 1 or another firewall.

Data transiting from the edge gateway 218 to the remote system 210 may be delivered using one or more public and/or private networks, such as a private enterprise network, the Internet, a cellular router, a backhaul Internet or other type backhaul connection. Significantly, the data transiting from the edge gateway 218 to the remote system 210 is secured by using a fifth security mechanism or by using one of security mechanisms previously discussed above. FIG. 3 depicts the data traffic delivered from the edge gateway 218 to the remote system 210 as being secured via an SAS (Shared Access Signature) Token, which may be managed through a token service 230 provided at the remote system 210. The edge gateway 218 authenticates to the token service 230 and requests an SAS token, which may be valid for only a finite period of time, e.g., two minutes, five minutes, thirty minutes, no more than an hour, etc. The edge gateway 218 receives and uses the SAS token to secure and authenticate an AMQP (Advanced Message Queuing Protocol) connection to the remote system 210 via which content data is transmitted from the edge gateway 218 to the remote system 210. Of course, using SAS tokens and the AMQP protocol to secure data transiting between the edge gateway 218 and the remote system 210 is only one of many possible security mechanisms. For example, any one or more suitable Internet-Of-Things (IOT) security mechanisms may be utilized to secure data transiting between the edge gateway 218 and the remote system 210, e.g., X.509 certificates, other types of tokens, other IOT protocols such as MQTT (MQ Telemetry Transport) or XMPP (Extensible Messaging and Presence Protocol), and the like. In these other embodiments, the service 230 provides and/or issues the appropriate security tokens or certificates, for example.

At the remote system 210, user authentication and/or authorization is provided by any one or more suitable authentication and/or authorization security mechanisms 232. For example, secure access to the remote system 210 may be provided by a domain authentication service, an API user authentication service, and/or any other suitable authentication and/or authorization service 232. As such, only users 235 that are authenticated and/or authorized via the authentication and/or authorization service 232 are able gain access to at least some of the data that is available at the remote system 210, which includes, inter alia, the data generated by the devices 202.

Thus, as described above, the security architecture 200 provides end-to-end security for data generated by devices or data sources 202 while operating in the process plant 100 to control a process, e.g., from the data's inception by the data sources 202 through its transmission to the remote system 210 to be operated on by one or more remote applications or services 208. Importantly, the security architecture 200 provides this end-to-end security while preventing malicious attacks from being incurred on the process plant 100.

It is noted that although FIG. 3 depicts wireless gateways 205A, 205B as communicatively connecting the devices or data sources 202 to the field gateway 212, in some arrangements one or more of the wireless gateways 205A, 205B are omitted and source data is transmitted from the data sources 202 directly to the field gateway 212. For example, the data sources 202 may transmit source data directly to the field gateway 212 via a big data network of the process plant 100. Generally speaking, a big data network of the process plant 100 is not the backbone plant network 110, nor is the big data network an industrial protocol network used to transmit control signals between devices using an industrial communication protocol (e.g., Profibus, DeviceNet, Foundation Fieldbus, ControlNet, Modbus, HART, etc.). Rather, a big data network of the process plant 100 may be an overlay network implemented for the process plant 100 that streams data between nodes for data processing and analytics purposes, for example. The nodes of a big data network may include, for example, the data sources 202, the wireless gateways 205A, 205B, and the field gateway 212, as well as any one or more of the components 111, 115-122, 126, 128, 135, 140-146, 152, 155, 158, 160, 170, 171-176, 178 shown in FIG. 2 and other components. Accordingly, for many nodes of a process plant data network include, respectively, a designated interface for process plant operations that typically utilizes an industrial communication protocol, and another designated interface for data processing/analytics operations that may utilize a streaming protocol, for instance. An example of a big data network which may be utilized in a process plant 100 is described in U.S. patent application Ser. No. 14/507,188 entitled "Regional Big Data in Process Control Systems" and filed on Oct. 6, 2014, the entire disclosure of which is incorporated by reference herein.

It is further noted with respect to FIG. 3 that in some embodiments, a wired gateway (not shown) may be utilized in lieu of one of the wireless gateways 205A, 205B. Still further, the field gateway 212, the data diode 215, and the edge gateway 218 may be physically co-located, such as indicated by the box 235 shown in FIG. 3, or one or more of the components 212, 215, 218 may be physically located across multiple locations. For example, one or more of the field gateway 212, the data diode 215, or the edge gateway 218 may be disposed at the process plant 100. Additionally or alternatively, one or more of the field gateway 212, the data diode 215, or the edge gateway 218 may be disposed remotely from the process plant 100.

The process plant 100 may be serviced by more than one field gateway 212, if desired, and any number of field gateways 210 may be serviced by a single edge gateway 218. In some embodiment, the remote system 210 is serviced by more than one edge gateway 218, if desired.

As previously discussed, data traffic that is transported across the data diode 215 is secured. Such data traffic may be communicated across the data diode 215, for example, by using serial communication or UDP communication. However, securing such communications without two-way communications is difficult and cumbersome, as typically both UDP and serial communications require both sides not only to communicate bi-directionally (which is not possible using the data diode 215), but also to remember and enter long key sequences. Thus, rather than using traditional, two-way communications to secure data transport across the unidirectional data diode 215, the transported data may be secured via a security provisioning process utilized between the edge gateway 218 and the field gateway 212. The security provisioning process establishes unique initial key or secret material that is shared between the edge gateway 218 and the field gateway 212 (e.g., a symmetric key or symmetric material), such as a join key. Using the join key, the edge gateway 218 and the field gateway 212 establish a secure connection that is used to exchange further key or secret material which, in turn, is utilized to securely transport data traffic across the data diode 215. The security provisioning process is described in more detail in U.S. patent application Ser. No. 15/332,751, filed concurrently herewith and entitled "Secured Process Control Communications", which is incorporated by reference herein.

Further, while the example above refers to the computing device 250 for analyzing process plant data as a component of the remote system 210 that receives process plant data via a data diode 215, this is only one of many embodiments, as the computing device 250 may receive process plant data via any suitable communication component of the process plant 100 in a secure manner. For example, the computing device 250 may be communicatively connected to the wireless gateways 205A, 205B, the field gateway 212, or the edge gateway 218. The communication paths may be secured from the devices 202 to the computing device 250 via encryption techniques, firewalls, a data diode, or with any other suitable security mechanism.

Once the process plant data is received at the computing device 250, the computing device 250 analyzes the process plant data to detect or identify conditions in corresponding process plant entities. Indications of the conditions are then transmitted to the user interface device 235 via a domain authentication service, for example, and/or to one of the operator workstations 171 of the process plant 100 via another communication network (not shown). In this manner, an operator may be alerted to the conditions occurring at various process plant entities within the process plant. The operator may then take the appropriate actions to resolve issues created by these conditions. In some situations, indications of the detected conditions of various process plant entities are transmitted to other computing devices, applications, or services, e.g., those located in the remote system 210, at the process plant 100, or at other locations, for their respective use and/or analysis.

As mentioned above, process plant data includes process parameter values collected over time for process parameters corresponding to a process plant entity. Process parameters include set points or measured values within the process plant of materials flowing through the process plant or of devices which perform physical functions to control the process (e.g., valve parameters, field device parameters, controller parameters, etc.). For example, process parameters include a temperature, pressure, flow rate, mass, volume, density, or area of a material flowing through the process plant or set points thereof. Process parameters also include a drive signal, travel, pressure, or temperature of a device which performs physical functions to control the process (e.g., a valve) or set points thereof. A process plant entity includes a device within a process plant which performs a physical function to control the process, such as a valve, a tank, a mixer, a pump, a heat exchanger, etc. The process plant entity may include a controller and/or an I/O device, in some cases. To illustrate, an exemplary scenario is described below with reference to FIG. 4 in which process parameters for a valve are analyzed to detect a condition of the valve.

Figure 4:
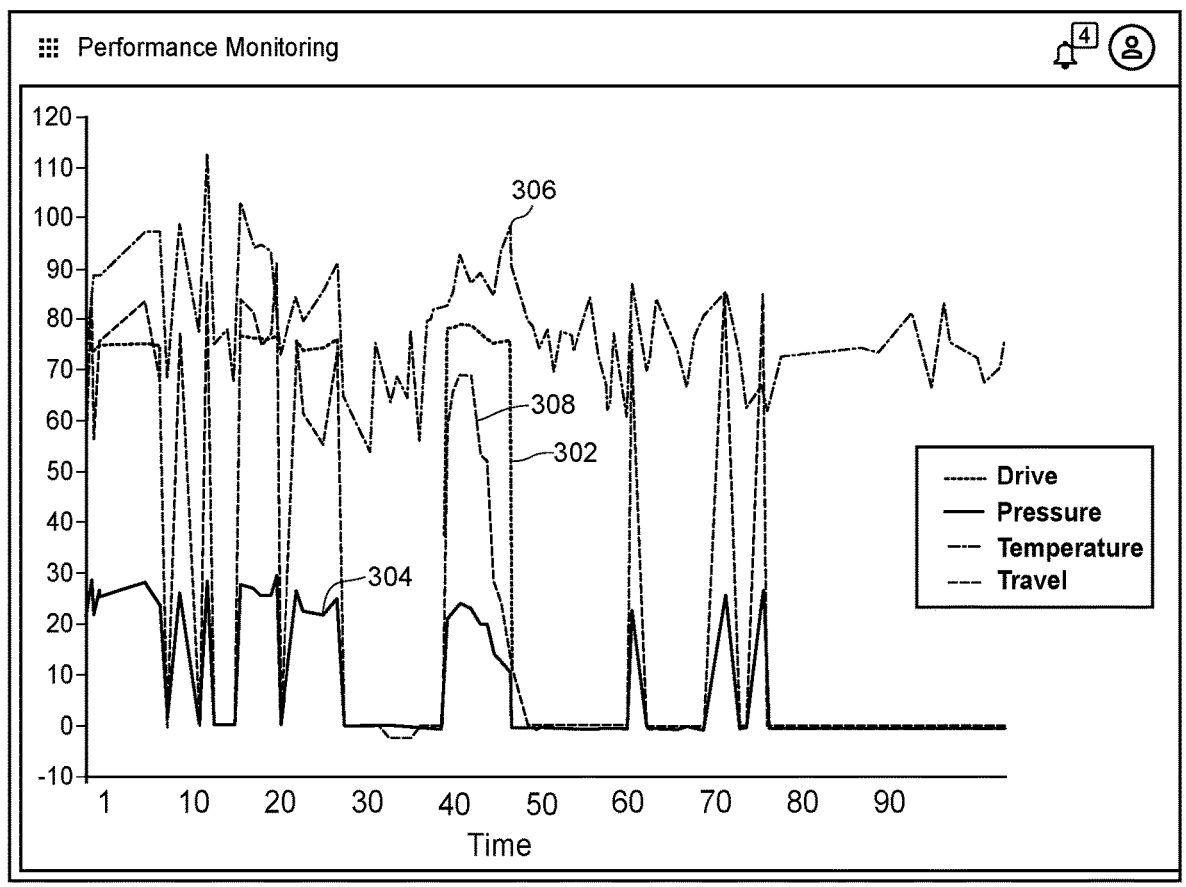
FIG. 4 illustrates example process parameter values collected over time for a process plant entity and which may be analyzed using techniques described herein.

FIG. 4 illustrates an example graphical depiction 300 of process parameter values collected over time for process parameters corresponding to a valve, in an example implementation of the techniques described herein. The process parameter values were collected from one or several of the devices 202 and analyzed at the computing device 250. Specifically, in this example implementation, the devices 202 streamed the process parameter values across a data diode 215 in real-time to the computing device 250. As shown in FIG. 4, the process parameters include a drive signal for the valve 302, an inlet pressure of the material at the valve 304, a temperature of the material at the valve 306, and the valve travel 308. Each process parameter value includes a corresponding time stamp (e.g., a drive signal of value 80 at collected at the time 40).

For each of the process parameters 302-308, the computing device 250 may perform statistical calculations on the corresponding process parameter values collected over time to generate a process parameter metric. For example, from the values of the temperature of the material at the valve 306, the computing device 250 may determine one or more process parameter metrics such as an average temperature of the material at the valve, the standard deviation in the temperature, a 20-second moving average of the temperature, and/or a 20-second decaying average of the temperature where the most recent temperature is weighted the highest and the temperature from 20 seconds earlier is weighted the lowest. The computing device 250 may additionally or alternatively determine an amplitude and frequency in a wave created by the various temperatures collected over time. Still further, the computing device 250 may apply various filters to the temperature values to remove noise and perform additional statistical calculations after the filters are applied.

The process parameter metrics for the valve or process plant entity are used to detect or identify a condition occurring at the valve/process plant entity. For example, the computing device 250 uses various machine learning techniques to generate a statistical model to detect or identify whether a particular condition is occurring or is present at the valve/process plant entity. A single statistical model may be used to detect or identify multiple conditions which may occur or be present at a process plant entity, or different statistical models may be specific to each type of condition, and the process parameter metrics may be applied to each statistical model to detect or identify which condition (if any) is occurring or present at the process plant entity. One or more of the statistical models may be generated by using suitable machine learning techniques such as linear regression, polynomial regression, logistic regression, naïve Bayes, decision trees, random forests, boosting, nearest neighbors, neural networks, etc.

In some embodiments, one or more statistical models are generated using training data which includes historical process parameter values previously produced by process plant entities of the process plant 100 and/or of other process plants. The historical process parameter values may be obtained from the data historian database 173B as shown in FIG. 2, for example.

In some cases, each of the historical process parameter values or a set of historical process parameter values corresponding to a particular time window (e.g., an hour) are classified into a subset of process parameter values associated with a particular condition which occurred or was present at the corresponding process plant entity during or associated with the time the historical process parameter values were generated. For example, a set of temperature values may be classified into a subset of process parameter values associated with an error at a heat exchanger when the temperature values were collected, e.g., within a threshold time period of an error being identified at the heat exchanger. Additionally, historical process parameter values are classified into another subset of process parameter values associated with normal operation of the process plant entity when no condition occurs or is present at the process plant entity at or around the time the historical process parameter values were generated. The computing device 250 compares a subset of historical process parameter values associated with a condition to another subset of historical process parameter values that are not associated with the condition to generate a statistical model. In this manner, the computing device 250 identifies characteristics of the process parameters which indicate that the process plant entity is experiencing a particular condition.

Naïve Bayes

In some embodiments, the machine learning technique for generating and/or utilizing a statistical model is naïve Bayes. For example, the computing device 250 generates a statistical model for each type of condition associated with the process plant entity (e.g., a performance monitoring metric, an error, a leak, dead band, dead time, mechanical wear, etc.). To illustrate, for a particular condition such as a leak at a heat exchanger, the computing device 250 classifies the historical process parameter values associated with heat exchangers into a first subset of process parameter values that are associated with a heat exchanger leak and a second subset of process parameter values that are not associated with a heat exchanger leak. Then the computing device 250 performs statistical calculations on each of the subsets. For example, for each historical process parameter in the first subset, the computing device 250 calculates an average of the corresponding historical process parameter values and a standard deviation of the corresponding historical process parameter values. The computing device 250 also calculates an average and standard deviation of historical process parameter values corresponding to each historical process parameter in the second subset. In some embodiments, the average for a historical process parameter is weighted, where historical process parameter values collected closer in time to the detection of the condition are weighted higher. For example, if a leak is detected at time t=9 minutes, the pressure value at time t=8 minutes 59 seconds is weighted higher than the pressure value at time t=8 minutes 40 seconds when calculating an average pressure value associated with a leak.

In some cases, the computing device 250 generates a first statistical model using the average and standard deviation for each historical process parameter in the first subset (e.g., those associated with a heat exchanger leak) assuming a Gaussian distribution or any other suitable probability density function. The computing device 250 also generates a second statistical model using the average and standard deviation for each historical process parameter in the second subset (e.g., those not associated with a heat exchanger leak) assuming a Gaussian distribution or any other suitable probability density function.

In an example, the computing device 250 generates the statistical models from the historical process parameters such as pressure, temperature, and flow rate of a process plant entity such as a heat exchanger. In this example, for the first statistical model, the computing device 250 determines an average pressure, a pressure standard deviation, an average temperature, a temperature standard deviation, an average flow rate, and a flow rate standard deviation for pressures, temperatures, and flow rates in the first subset of process parameter values (e.g., those associated with a heat exchanger leak). The computing device 250 then generates a pressure distribution, a temperature distribution, and a flow rate distribution for the first subset accordingly. For the second statistical model, the computing device 250 determines an average pressure, a pressure standard deviation, an average temperature, a temperature standard deviation, an average flow rate, and a flow rate standard deviation for pressures, temperatures, and flow rates in the second subset of process parameter values (e.g., those not associated with a heat exchanger leak). The computing device 250 generates a pressure distribution, a temperature distribution, and a flow rate distribution for the second subset accordingly.

The first and second statistical models are then compared with process parameter metrics calculated from on-line process plant data received from the process plant. Based on the comparison, the computing device 250 determines which of the first and second statistical models more closely matches the process parameter metrics, e.g., by determining respective measures of similarity or difference and comparing the respective measures. When the process parameter metrics more closely match the first statistical model, the computing device 250 determines that the process plant entity corresponding to the process parameter metrics (e.g., in this example scenario, a heat exchanger) is experiencing a leak. On the other hand, when the process parameter metrics more closely match the second statistical model, the computing device 250 determines that the process plant entity corresponding to the process parameter metrics (e.g., in this example scenario, a heat exchanger) is not experiencing a leak. As mentioned above, a process parameter metric is calculated from process parameter values received in a secure manner and collected over time. Thus, using the above techniques, a moving average of temperature values in a heat exchanger (e.g., a temperature metric) may be used to detect a leak at the heat exchanger.

Continuing the example above, the pressure metric (e.g., a decaying average of pressures) is compared to the pressure distribution generated according to the average pressure and pressure standard deviation from the first subset of process parameter values (e.g., those associated with a heat exchanger leak). Based on the comparison, the computing device 250 determines a probability corresponding to the difference (in standard deviations) between the pressure metric and the average pressure for the first subset of process parameter values. The computing device 250 also performs similar steps to determine a probability corresponding to the difference (in standard deviations) between the temperature metric and the average temperature for the first subset of process parameter values and a probability corresponding to the difference (in standard deviations) between the flow rate metric and the average flow rate for the first subset of process parameter values. The probabilities are then combined (multiplied, aggregated, etc.) to determine an overall probability that the determined process parameter metrics correspond to the first subset of process parameter values associated with a heat exchanger leak.

Additionally, the pressure metric, temperature metric, and flow rate metric are compared to the pressure distribution, temperature distribution, and flow rate distribution, respectively, determined based on the second subset of process parameter values (e.g., those not associated with a heat exchanger leak). Based on the comparison, the computing device 250 determines a probability corresponding to the difference (in standard deviations) between the pressure metric and the average pressure for the second subset of process parameter values, a probability corresponding to the difference (in standard deviations) between the temperature metric and the average temperature for the second subset and a probability corresponding to the difference (in standard deviations) between the flow rate metric and the average flow rate for the second subset of process parameter values. The probabilities are combined (multiplied, aggregated, etc.) to determine an overall probability that the process parameter metrics correspond to the second subset of process parameter values which are not associated with a heat exchanger leak.

Subsequently, the overall probability for the first subset is compared to the overall probability for the second subset. When the overall probability for the first subset is higher, the computing device 250 determines that the corresponding process plant entity, e.g., the heat exchanger, is experiencing a leak. Otherwise, the computing device 250 determines that the corresponding process plant entity, e.g., the heat exchanger, is not experiencing a leak. As mentioned above, the computing device 250 generates statistical models for each type of condition and determines whether the corresponding process plant entity is experiencing each type of condition accordingly.

Decision Tree

In other embodiments, the machine learning technique for generating and/or utilizing a statistical model is a decision tree or a machine learning technique using decision trees, such as random forests or boosting. For example, when the machine learning technique is random forests, the computing device 250 collects several representative samples of each of the process plant data. Using each representative sample, the computing device 250 generates a decision tree for determining a likelihood that a condition is occurring at a process plant entity. The computing device 250 then aggregates and/or combines each of the decisions trees to generate a statistical model, by for example averaging the likelihoods determined at each individual tree, calculating a weighted average, taking a majority vote, etc. In some embodiments, the computing device 250 may also generate decision trees when the machine learning technique is boosting.

Each decision tree includes several nodes, branches, and leaves, where each node represents a test on a process parameter metric (e.g., is the decaying flow rate average greater than 20?), each branch represents the outcome of the test (e.g., the decaying flow rate average is greater than 20), and each leaf represents a likelihood that the process plant entity is experiencing a particular type of condition. For example, the branches of the decision tree represent likelihoods the process plant entity will experience an error, a leak, dead band, dead time, mechanical wear, etc. Therefore, the computing device 250 can traverse each decision tree using process parameter metrics from the collected process plant data to determine which conditions, if any, a process plant entity is experiencing. If the likelihood that the process plant entity is experiencing a particular type of condition is above a threshold likelihood (e.g., 0.5, 0.7, etc.), the computing device 250 determines that the process plant entity is experiencing the condition and transmits an indication of the condition to the user interface device and/or to another computing device, service, or application.

For example, the computing device 250 generates a decision tree including a first node that corresponds to whether a 20-second moving average pressure is above 25. If the 20-second moving average pressure is not above 25, a first branch connects to a first leaf node which indicates that the likelihood that the process plant entity is experiencing mechanical wear is 0.6. If the 20-second moving average pressure score is above seven, a second branch connects to a second node which corresponds to whether the standard deviation in the temperature is above 10.

If the standard deviation in the temperature is above 10, a third branch connects to a second leaf node which indicates that the likelihood that the process plant entity is experiencing mechanical wear is 0.75. However, if the standard deviation in the temperature is not above 10, a fourth branch connects to a third leaf node which indicates that the likelihood that the process plant entity is experiencing mechanical wear is 0.25. While the decision tree includes three leaf nodes and four branches, this is merely an example for ease of illustration only. Each decision tree may include any number of nodes, branches, and leaves, having any suitable number and/or types of tests on process parameter metrics.

In any event, by combining and/or aggregating several decision trees as in random forests or boosting methods, the computing device 250 identifies the process parameter metrics which are the most important for determining the likelihood that a process plant entity is experiencing a particular type of condition. The most important process parameter metrics are those that most frequently result in early splitting of the decision trees and are most indicative of whether or not a process plant entity is experiencing a condition. Referring to the example decision tree above, the 20-second moving average pressure may be more important than the standard deviation in the temperature, because the standard deviation in the temperature appears lower in the tree than the 20-second moving average pressure. Therefore, in this example, 20-second moving average pressure is the most important process parameter metric.

In some embodiments, process parameter metrics are assigned weights according to their respective levels of importance. The computing device 250 uses the assigned weights when generating the statistical models. In some scenarios, a process parameter metric which is the least important may be weighted by a factor of 0 or almost 0 to filter out the process parameter metric from the statistical model.

Regression

In yet other embodiments, the machine learning technique for generating and/or utilizing a statistical model is a regression analysis, such as logistic regression, linear regression, polynomial regression, etc. For example, in addition to classifying historical process parameter values into respective subsets of process parameter values that are and that are not associated with a particular condition, each historical process parameter value is assigned a performance monitoring metric. The performance monitoring metric is indicative of a level of performance or rating of the process plant entity, such as an overall device health parameter according to the health status of the corresponding process plant entity.

Based on the historical process parameter values and corresponding performance monitoring metrics, the computing device 250 generates a statistical model as an equation which most closely approximates the performance monitoring metrics from the historical process parameter values. In some embodiments, an ordinary least squares method is used to minimize the difference between the value of predicted performance monitoring metrics using the statistical model and the actual performance monitoring metrics assigned to the historical process parameter values. Additionally, the differences between the values of each predicted performance monitoring metric ($\hat{y}_i$) using the statistical model and performance monitoring metric ($y_i$) are aggregated and/or combined in any suitable manner to determine a mean square error (MSE) of the regression. The MSE then is used to determine a standard error or standard deviation ($\sigma_\varepsilon$) in the statistical model, which in turn is used to create confidence intervals.

Using the statistical model, the computing device 250 applies the process parameter metrics calculated from the process plant data to the equation generated as a result of the regression analysis (e.g., the generated statistical model). Accordingly, the computing device 250 determines or identifies a performance monitoring metric (e.g., an overall device health parameter) for the process plant entity.

While the process parameter values are included in a graphical depiction in FIG. 4, this is for ease of illustration only. The process parameter values may be collected and analyzed at the computing device 250 as data points having corresponding time stamps (e.g., as time-series data) without presenting the process parameter values in a display. Also, while the computing device 250 is described as using machine learning techniques to detect or identify a condition occurring at the process plant entity, a condition may additionally or alternatively be detected or identified by applying a set of rules. For example, the computing device 250 identifies excessive dead band in a valve by comparing the difference in the drive signal and the valve travel. When the difference exceeds a predetermined threshold amount, the computing device 250 identifies excessive dead band in the valve.

Figure 5:
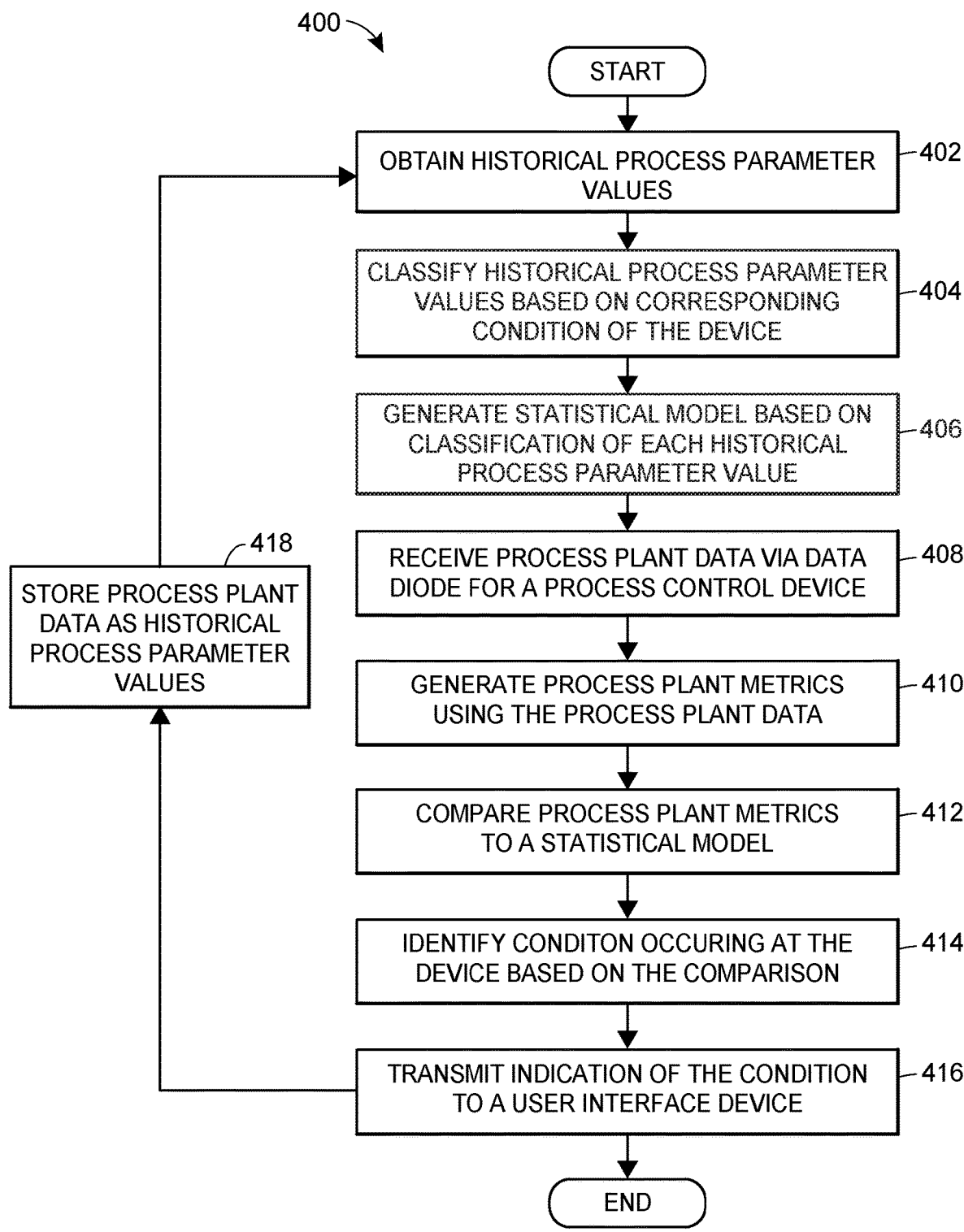
FIG. 5 is a flow diagram representing an exemplary method for analyzing securely communicated process plant data to detect or identify a condition in a process plant entity.

FIG. 5 depicts a flow diagram representing an exemplary method 400 for detecting or identifying a condition in a process plant entity based on an analysis of securely received data. The method 400 may be executed by the computing device 250 as shown in FIG. 3, or by any suitable computing device. As mentioned above, the computing device 250 may be included in the remote system 210 and/or may be communicatively connected to the wireless gateways 205A, 205B, the field gateway 212, the data diode 215, and/or the edge gateway 218.

At block 402, historical process parameter values are obtained for several process parameters corresponding to a process plant entity (e.g., a valve, a tank, etc.). Each of the historical process parameter values or a set of historical process parameter values corresponding to a particular time window (e.g., an hour) are classified into a subset of process parameter values that are associated with a particular condition which occurred at the corresponding process plant entity at or around the time the historical process parameter values were generated (block 404). For example, a set of temperature values may be classified into a subset of process parameter values associated with an error at a heat exchanger when the temperature values were collected within a threshold time period of an error being identified at the heat exchanger. Additionally, historical process parameter values may be classified into a subset of process parameter values that are associated with normal operation of the process plant entity and/or when the condition does not occur or is not present at the process plant entity at or around the time the historical process parameter values were generated.

At a block 406, a statistical model is generated based on the subsets of historical process parameter values, e.g., by using various rules and/or machine learning techniques. The machine learning techniques may include linear regression, polynomial regression, logistic regression, naïve Bayes, decision trees, random forests, boosting, nearest neighbors, neural networks, etc. In some embodiments, a single statistical model is generated to detect or identify several types of conditions which may occur or may be present at a process plant entity. In other embodiments, a different statistical model is generated for each type of condition which may occur or may be present at a process plant entity. In some embodiments, process parameter metrics are compared with multiple statistical models indicative of various conditions (or the absence thereof) to determine which statistical model most likely corresponds to the process parameter metrics.

In any event, at block 408, process plant data for a process plant entity is received in a secure manner. For example, the process plant data may be transmitted to the computing device 250 via a data diode 215, using firewalls, encryption techniques, and/or any other suitable security mechanisms. Process plant data may include process parameters corresponding to the process plant entity, such as a drive signal, a valve travel, a travel set point, a density, an area, a mass, a volume, a pressure, a temperature, or a flow rate corresponding to a valve or a material flowing through the valve. Generally speaking, process plant data may be data that is generated as a result of the process plant entity operating to control the industrial process, and may be descriptive of a behavior or operations of the process plant entity. The process plant data may or may not be generated by the process plant entity itself. For example, valve data may be descriptive of and/or generated by a valve itself (e.g., a measure of how open or closed the valve is), and/or may be descriptive of and/or generated by an actuator of the valve (e.g., how often the actuator applies a particular signal to the valve). For each process parameter, the computing device 250 receives several process parameter values over several instances of time. Each process parameter value includes a corresponding timestamp indicative of when the process parameter value is generated, for example.

At block 410, one or several process parameter metrics are generated, determined, and/or calculated for each process parameter based on the corresponding received process parameter values. Process parameter metrics include, for example, an average value for the process parameter, a standard deviation, a moving average over a predetermined time period, a decaying average over the predetermined time period, maximum/minimum values for the process parameter, an amplitude, phase, and/or frequency of a wave corresponding to the process parameter values over time, etc.

Each of the process parameter metrics are compared to the statistical model(s) (block 412) to detect or identify which conditions, if any, the process plant entity is experiencing (block 414). For example, when the machine learning technique is naïve Bayes, the process parameter metrics are compared to a distribution for a subset of process parameter values associated with a condition and another distribution for a subset of process parameter values which are not associated with the condition. The computing device 250 determines which distribution is more closely matched to the process parameter metrics and detects/identifies whether or not the process plant entity is experiencing the condition based on the distribution matches. In another example, when the machine learning technique is decision trees, random forests, or boosting, the computing device 250 traverses the nodes of the decision trees using the process parameter metrics to determine which conditions, if any, a process plant entity is experiencing. In yet another example, when the machine learning technique is a regression analysis, such as logistic regression, linear regression, polynomial regression, etc., the computing device 250 applies the process parameter metrics to the regression equation to detect or identify a performance monitoring metric for the process plant entity.

At block 416, the computing device 250 transmits an indication of the identified condition to a user interface device 235 to alert an operator of the condition. An indication of the condition may be an alarm or an error message including the type of condition detected (e.g., a performance monitoring metric, dead band, mechanical wear, etc.), the process plant entity experiencing the condition, the process parameter values used to detect the condition, steps to resolve potential issues created by the condition, or any other suitable information.

In some embodiments, the computing device 250 also causes an alarm or event to be generated at the process plant 100 according to the identified condition for the process plant entity. For example, the computing device 250 transmits a communication to the process plant 100 to display an alarm or event for the process plant entity or transmits a request to the user interface device 235 to transmit the communication to the process plant 100 to display the alarm or event for the process plant entity. In other embodiments, the computing device 250 transmits a control signal to the process plant 110 to adjust operation of the process plant entity based on the identified condition. For example, when the process plant entity is experiencing a leak, the computing device 250 transmits a control signal to the process plant 110 to shut down operation of the process plant entity.

When the condition of the process plant entity becomes known (e.g., an operator evaluates the process plant entity to determine whether any condition is occurring at the process plant entity), the process parameter values are added to the historical process parameter values (block 418), and the statistical model(s) is/are updated accordingly. For example, the process parameter values are stored in the data historian database 173B as shown in FIG. 2.

Additionally or alternatively, the computing device 250 transmits the indication of the condition to another computing device, service, or application (e.g., for further analysis). For example, a condition determination application or module within the computing device 250 detects or identifies a condition of a process plant entity and transmits an indication of the identified condition to another application or module in the computing device 250 or another computing device. The other application or module may perform additional analytics, for example to detect the health of the process plant entity relative to other process plant entities in the same process plant 100, enterprise, industry, etc. as described in more detail below with reference to FIGS. 7A-7B. The other application or module detects a condition of the process plant entity based on the relative health of the process plant entity.

In some embodiments, the condition determined based on the relative health of the process plant entity is compared to the condition determined based on the machine learning methods. When the condition determined based on the relative health indicator for the process plant entity and the condition determined based on the machine learning methods are not in agreement, the other application or module performs further analysis to detect or identify the condition occurring at the process plant entity and/or transmits indications of the conditions and relevant process parameter metrics to an operator for further review.

To increase the accuracy of detecting or identifying a condition occurring at a process plant entity, separate statistical models may be generated respectively for certain operating characteristics of the process plant entity. For example, when the process plant entity is a valve, different statistical models are generated for each mode in which the valve may operate, such as full stroke cycling, continuous throttling, periodic throttling, etc. When the computing device 250 identifies the mode in which the valve is currently operating (e.g., as in a manner discussed above), process parameter values for the valve are compared to a statistical model generated based on historical process parameter values of valves operating in the same mode. In this manner, the statistical analysis is more precise. Process parameter values in one mode of operation may indicate different conditions from process parameter values in another mode of operation. For example, while a particular amount of dead time is excessive in the continuous throttling mode, the same amount of dead time may be acceptable in the full stroke cycling mode.

The statistical models for each mode may be generated in a similar manner described above, using various machine learning techniques such as linear regression, polynomial regression, logistic regression, naïve Bayes, decision trees, random forests, boosting, nearest neighbors, neural networks, etc. The historical process parameter values are further classified according to the mode of operation of a corresponding valve and the statistical models are generated based on subsets of historical process parameter values for each mode of operation and/or condition, for example.

However, before on-line process parameter values for a valve are compared to the statistical model for the same mode of operation as the valve, the computing device 250 determines the mode of operation of the valve. The mode of operation of the valve may be determined using the same set of process parameters that are compared with the statistical model, a different set of process parameters, or a set of process parameters which overlaps with the set of process parameters that are compared with the statistical model. In any event, example process parameters for determining the mode of operation of the valve typically may include: the valve travel, the travel set point, and/or the drive signal of the valve. To determine the mode of operation of the valve, the computing device 250 additionally or alternatively uses process parameter metrics based on process parameter values collected over time, such as an average valve travel per reversal, a moving average valve travel per reversal, a decaying valve travel per reversal, a standard deviation of the valve travel, or a number of reversals per time period. (A reversal is a transition in the valve travel from opening to closing or from closing to opening.)

In some embodiments, a mode determination application or module within the computing device 250 determines the mode of operation of the valve. Then the mode determination application or module transmits an indication of the determined mode of operation to the user interface device 235 to alert an operator of the mode of operation. Additionally, the mode determination application or module may transmit the indication of the determined mode of operation to another application or module in the computing device 250 or another computing device. The other application or module then uses the determined mode of operation to compare on-line process parameters for a valve to a statistical model for the same mode of operation as the valve to detect or identify a condition, if any, occurring at the valve.

Figure 6A:
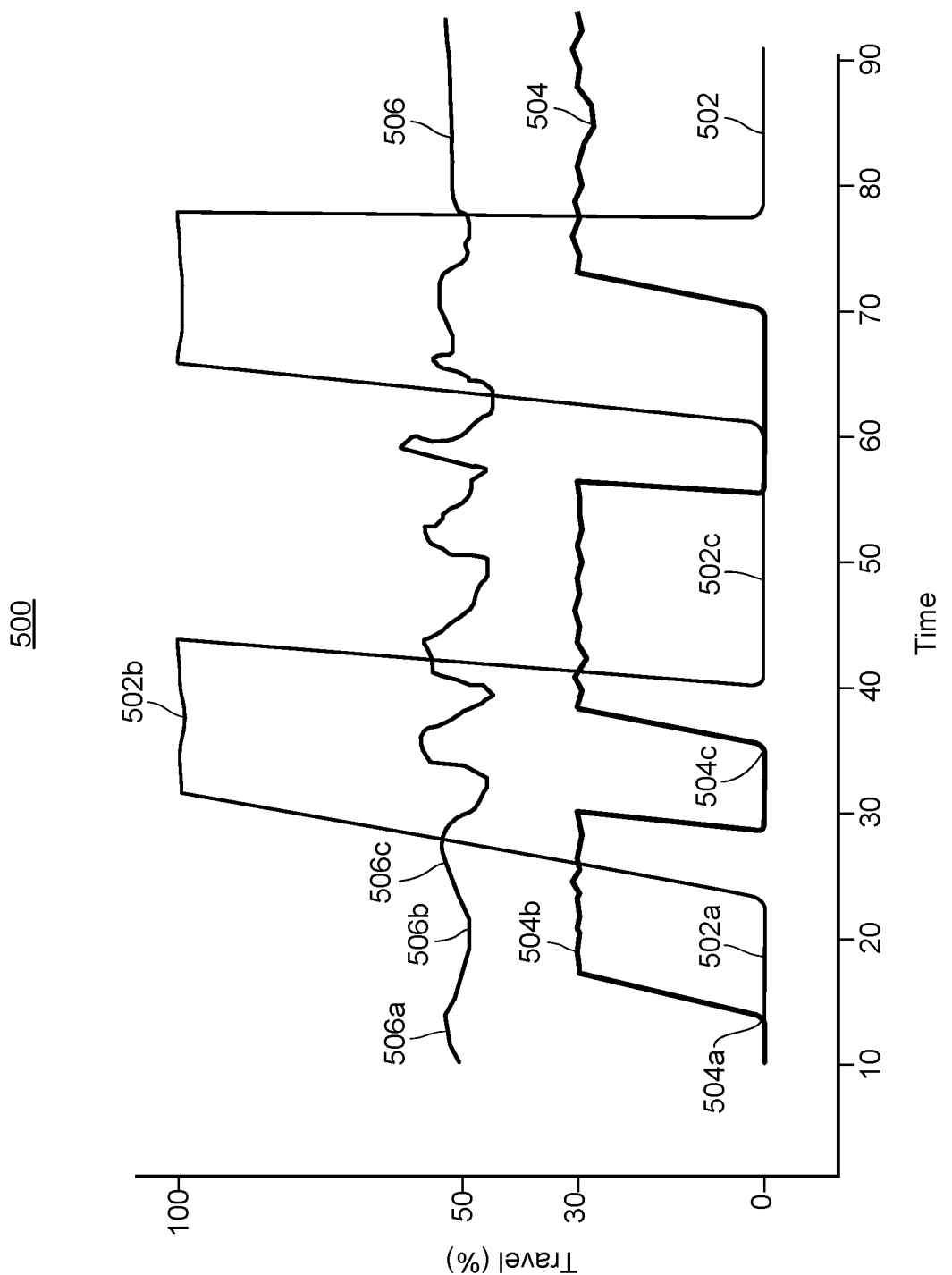
FIG. 6A illustrates an example graphical depiction of valve travel percentages collected over time for three valves each operating under a different mode of operation.

FIG. 6A illustrates an example graphical depiction 500 of valve travel data collected over time for three valves each operating under a different mode of operation, using at least some of the novel techniques described herein. A first valve 502 is operating under a full stroke cycling mode. A second valve 504 is operating under a periodic throttling mode, and a third valve 506 is operating under a continuous throttling mode. The valve travel may be 0 percent when the valve is completely open, 100 percent when the valve is completely closed, or anywhere in between (e.g., 50%). As shown in FIG. 6A, the valve travel as a function of time has a distinct pattern for each mode of operation.

For example, the valve travel for the third valve 506 in the continuous throttling mode has a sinusoidal pattern with a constant frequency and an amplitude significantly less than 100% (e.g., 20%). In the continuous throttling mode, the third valve 506 is stationary or constantly moving in response to adjustments in the process control system 100. However, the third valve 506 does not completely open or close in this mode unless operation is shut down. The valve travel for the third valve 506 at time t=15 is about 52 percent (reference 506*a*), at time t=20 is about 48 percent (reference 506*b*), and at time t=25 is once again about 52 percent (reference 506*c*).

On the other hand, in the full stroke cycling mode, the first valve 502 goes from completely open to completely closed and vice versa but does not open or close partially. Accordingly, the valve travel for the first valve 502 in the full stroke cycle mode is a step function pattern, where the valve travel for the first valve 502 from time t=10 to t=20 is 0 percent (reference 502*a*), from time t=25 to t=40 is 100 percent (reference 502*b*), and from time t=42 to t=60 is 0 percent (reference 502*c*).

The periodic throttling mode is a combination of the full stroke cycling and continuous throttling modes. In the periodic throttling mode, the second valve 504 alternates between states of throttling and fully closed/open. As such, the valve travel for the second valve 504 in the periodic throttling mode is a combination of a step function pattern and a sinusoidal pattern. The valve travel for the second valve 504 from time t=10 to t=15 is 0 percent (reference 504*a*) and then transitions to 30 percent (reference 504*b*) similar to a step function. Then from time t=18 to t=28, the valve travel oscillates in a sinusoidal pattern around 30 percent with an amplitude of about 2 percent. At about time t=30 the valve travel transitions back to 0 percent (reference 504*c*) and remains there until time t=35 before transitioning once again to 30 percent. The valve travel for the second valve 504 in the periodic throttling mode exhibits two frequencies, a first small frequency transitioning back and forth from 0 to 30 percent and a second large frequency oscillating back and forth from about 29 percent to about 31 percent each time the valve travel transitions from 0 to 30 percent.

Based on the distinct patterns in the graphical depictions of valve travel as a function of time for the various modes of operation, the computing device 250 determines the mode of operation by analyzing the valve travel data over time of a valve. Additionally or alternatively, the computing device 250 analyzes other valve parameter values such as the drive signal manipulating the valve, the travel set point of the valve, and/or other valve parameter values over time to determine the mode of operation of the valve. Other parameters may also be analyzed to determine the mode of operation for the valve, such as actuator pressures.

In some embodiments, the computing device 250 determines the mode of operation by applying a set of predetermined rules to the process parameters or process parameter metrics. For example, the computing device 250 may convert the valve travel over time to the frequency domain and detect or identify whether the valve travel includes high frequencies (continuous throttling), low frequencies (full stroke cycling), or a combination of high and low frequencies (periodic throttling). The computing device 250 may apply filters such as high pass, low pass, or band pass filters to detect or identify the frequencies and determine the corresponding mode of operation for the valve.

Additionally or alternatively, the computing device 250 calculates process parameter metrics using valve data. For example, using the valve travel measurement data, process parameter metrics such as an average valve travel per reversal, a moving average valve travel per reversal, a decaying valve travel per reversal, a standard deviation of the valve travel, a number of reversals per time period, etc. may be calculated. For example, for the first valve 502 a reversal occurs at about time t=40, because the valve closes (the valve travel increases) at about t=20 and then beings to open (the valve travel decreases) at about time t=40. During this time frame, the valve travel move from 0 percent to 100 percent so the valve travel per reversal is 100 percent. However, the above are merely example process parameters and/or process parameter metrics which may be used to determine the mode of operation for a valve. Any suitable process parameters and/or process parameter metrics may be utilized.

Figure 6B:
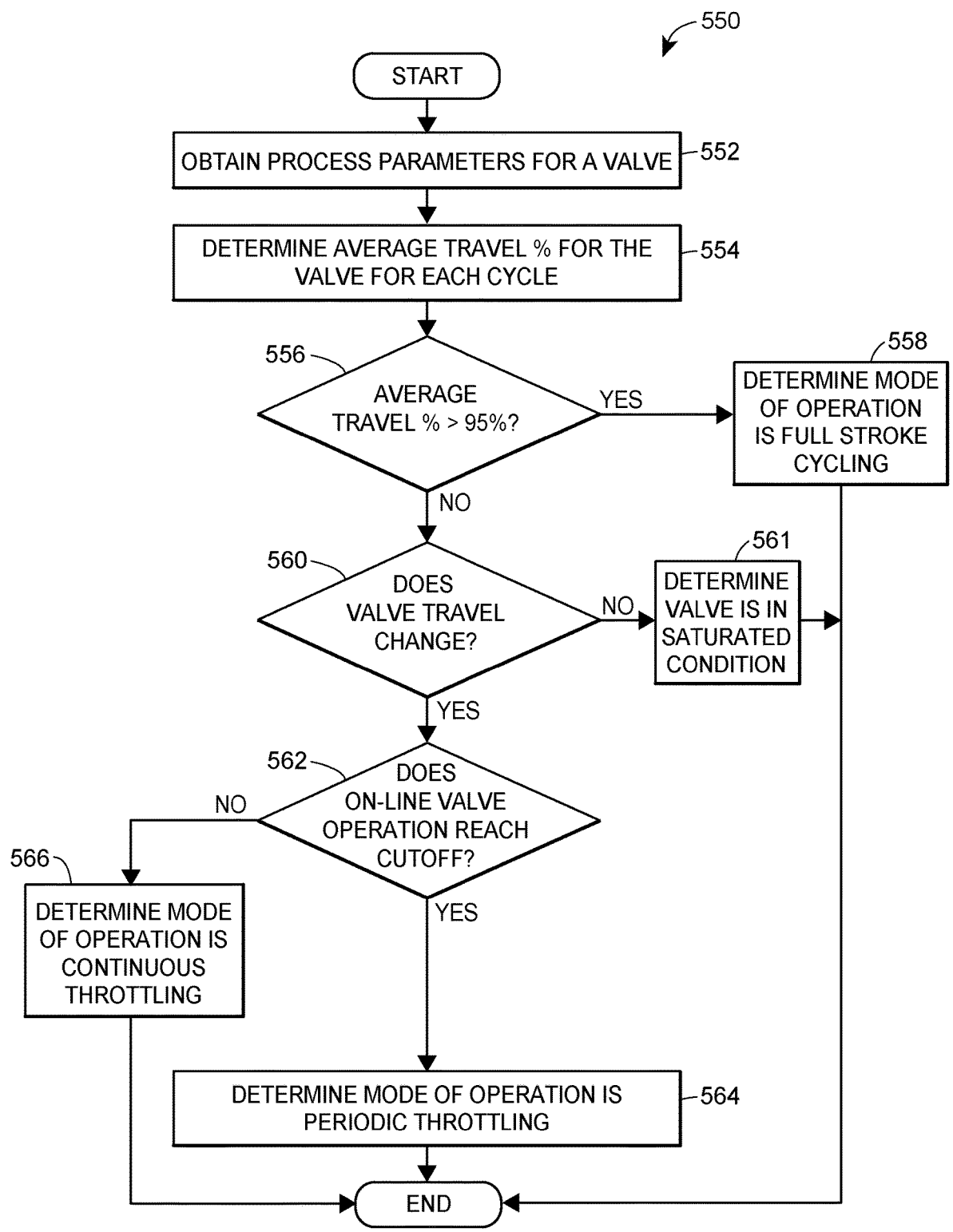
FIG. 6B is a flow diagram representing an exemplary rules-based method for detecting or identifying the mode of operation of a valve based on the process parameter values for the valve.

FIG. 6B depicts a flow diagram representing an exemplary rules-based method 550 for detect or identifying the mode of operation of a valve. The method 550 may be executed by the computing device 250 as shown in FIG. 3, or by any suitable computing device, e.g., via a mode determination application or module. As mentioned above, the computing device 250 may be included in the remote system 210 and/or may be communicatively connected to the wireless gateways 205A, 205B, the field gateway 212, the data diode 215, and/or the edge gateway 218.

At block 552, process parameter values for a valve (e.g., valve parameter values) are received in a secure manner. For example, the process or valve parameter values may be transmitted to the computing device 250 via a data diode, using firewalls, encryption techniques, and/or any other suitable security mechanisms. For each process parameter or valve parameter, the computing device 250 receives several process parameter values corresponding to several instances of time. Each process parameter value includes a corresponding timestamp indicative of when the process parameter value was generated. The process or valve parameters for detecting or identifying the mode of operation of the valve may include the same set of process or valve parameters used to detect or identify a condition occurring at the valve (e.g., as described in method 400 of FIG. 5), a different set of process or valve parameters used to detect or identify the condition occurring at the valve, or an overlapping set of process or valve parameters where some process/valve parameters in the set are the same and others are different. The process/valve parameters for the valve may include a valve travel measurement or indication, a drive signal for the valve, a valve travel set point, an actuator pressure, etc.

In any event, at block 554, one or more process parameter metrics of the valve are determined. For example, an average valve travel per cycle is determined for the valve. The average valve travel per cycle is determined by calculating the change in valve travel each time the valve transitions from opening to closing or closing to opening and then averaging the calculated changes in valve travel. For example, turning to the graphical depiction 500 of valve travel over time in FIG. 6A, the first valve 502 includes a change in valve travel of 100 percent between time t=10 and time t=40 (from 0 to 100 percent). The change in valve travel is also 100 percent from time t=42 to t=60 (from 100 to 0 percent). Moreover, the change in valve travel is once again 100 percent from time t=70 to t=90. Accordingly, the average valve travel per cycle is 100 percent. By contrast, the third valve 506 includes a change in valve travel of about 4 percent between time t=15 to t=20 (from 52 to 48 percent) and the 4 percent change is steady until time t=35 where the change in valve travel increases to about 10 percent from time t=30 to t=35 (from 45 to 55 percent). There, the average valve travel per cycle is about 7 percent.

At block 556, the computing device 250 determines whether the average valve travel per cycle is greater than a threshold number (e.g., 95 percent). When the average valve travel per cycle is greater than 95 percent, the computing device 250 determines that the mode of operation for the valve is full stroke cycling (block 558). For example, the first valve 502 as shown in FIG. 6A has an average valve travel per cycle of above 95 percent and therefore is in the full stroke cycling mode. In some embodiments, the computing device 250 then performs analytics, for example, using the machine learning techniques above to detect or identify a condition, if any, occurring at the valve. The condition is identified using statistical models generated from historical process parameter values for valves in the full stroke cycling mode, for instance. In other embodiments, the mode determination application or module within the computing device 250 transmits an indication of the determined mode of operation to the user interface device 235 or to another application or module in the computing device 250 or another computing device. The other application or module may perform analytics based on the determined mode of operation and/or valve data, for example, using the machine learning techniques above to detect or identify a condition, if any, occurring at the valve.

When the average valve travel per cycle is not greater than the threshold number (e.g., 95 percent), the computing device 250 determines whether the valve travel changes over the time period by more than a threshold margin of error (e.g., 2 percent) (block 560). When the valve travel does not change, the computing device 250 determines that the valve does not move and is in a saturated condition (block 561). On the other hand, when the valve travel changes, the computing device 250 determines whether the valve travel values received during on-line operation occasionally reach a cutoff (e.g., 0 percent or 100 percent) (block 562). When the valve travel values occasionally reach the 0 percent or 100 percent cutoff (e.g., at least once), the computing device 250 determines that the mode of operation for the valve is periodic throttling (block 564). For example, the valve travel for the second valve 504 as shown in FIG. 6A is 0 percent from time t=10 to t=15. In some embodiments, the computing device 250 then performs analytics for example, using the machine learning techniques above to detect or identify a condition, if any, occurring at the valve. The condition is identified using statistical models generated from historical process parameter values for valves in the periodic throttling mode. In other embodiments, the mode determination application or module within the computing device 250 transmits an indication of the determined mode of operation to the user interface device 235 or to another application or module in the computing device 250 or another computing device. Then the other application or module performs analytics for example, using the machine learning techniques above to detect or identify a condition, if any, occurring at the valve.

On the other hand, when the valve travel values do not reach the 0 percent or 100 percent cutoff, the computing device 250 determines that the mode of operation for the valve is continuous throttling (block 566). For example, the valve travel for the third valve 506 as shown in FIG. 6A remains between about 45 and 55 percent and never reaches 0 or 100 percent. In some embodiments, the computing device 250 then performs analytics for example, using the machine learning techniques above to detect or identify a condition, if any, occurring at the valve. The condition is identified using statistical models generated from historical process parameter values for valves in the continuous throttling mode. In other embodiments, the mode determination application or module within the computing device 250 transmits an indication of the determined mode of operation to the user interface device 235 or to another application or module in the computing device 250 or another computing device. Then the other application or module performs analytics for example, using the machine learning techniques above to detect or identify a condition, if any, occurring at the valve.

While the method 550 includes a set of predetermined rules for detect or identifying the mode of operation of the valve, this is merely one example for ease of illustration only. The computing device 250 may use any suitable set of predetermined rules to detect or identify the mode of operation of the valve, including additional or alternative rules to the rules included in the method 550. Moreover, while the set of predetermined rules in the method 550 are applied to the valve travel process parameter, the set of predetermined rules may be applied to any number of process parameters for the valve.

In other embodiments, the computing device 250 determines the mode of operation using various machine learning techniques, similar to the machine learning techniques mentioned above to detect or identify the condition occurring at a process plant entity. For example, for several process parameters related to a valve (e.g., valve travel, valve drive signal, valve travel set point, actuator pressure, etc.), the computing device 250 receives historical process parameter values collected over time, where each of the historical process parameter values are classified by mode of operation for the corresponding valve. The computing device 250 then analyzes each subset of historical process parameter values corresponding to a particular mode of operation to generate a statistical model for each mode of operation. When process parameter values for a valve and corresponding time stamps are received at the computing device 250, the computing device 250 compares the process parameter values to each statistical model to determine the mode of operation for the valve.

Figure 6C:
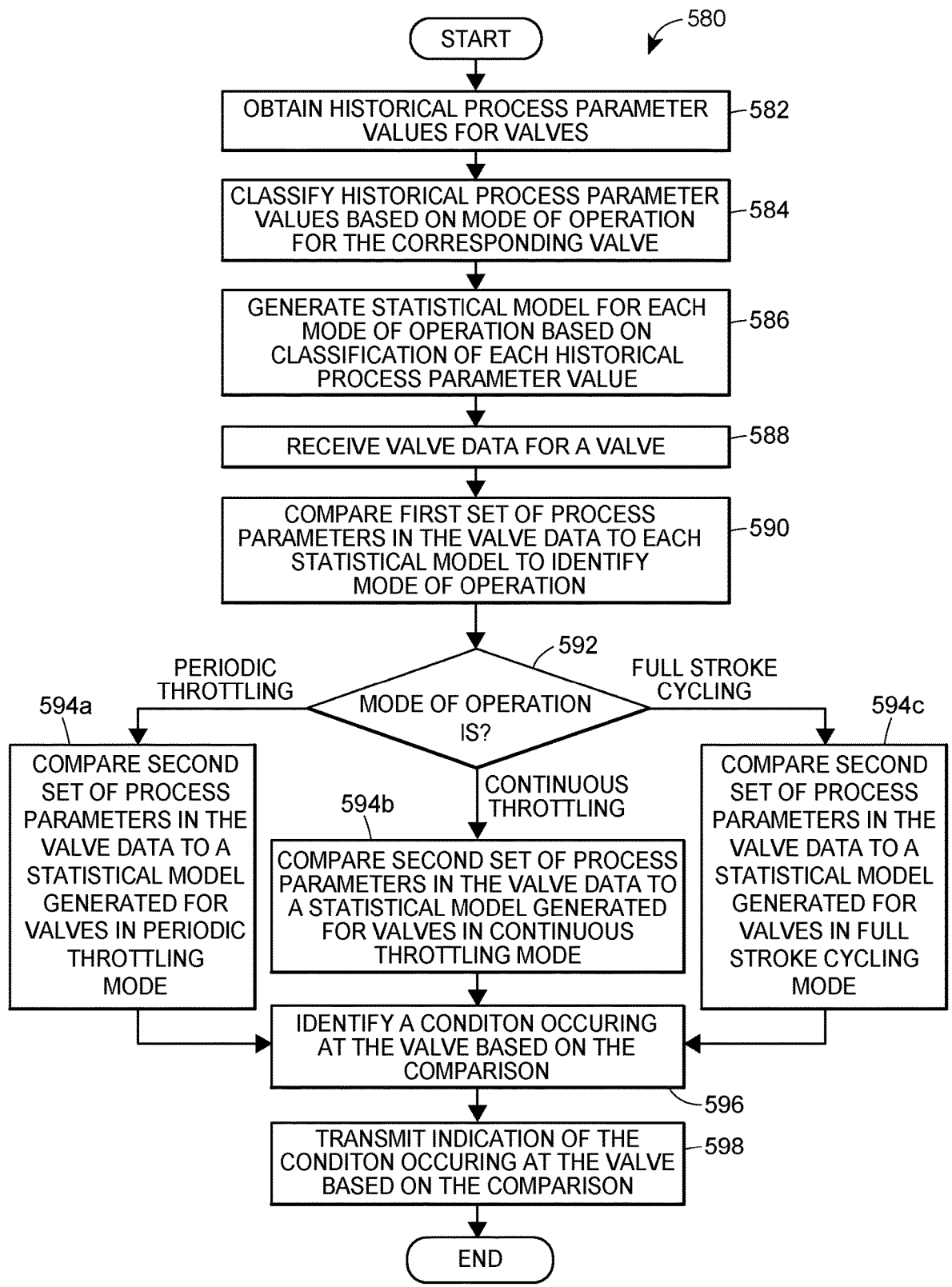
FIG. 6C is a flow diagram representing an exemplary machine learning method for detecting or identifying the mode of operation of a valve.

FIG. 6C depicts a flow diagram representing an exemplary method 580 for detecting or identifying the mode of operation of a valve. The method 580 may be executed on the computing device 250 as shown in FIG. 3 or any suitable computing device, via a mode determination application or module for example. As mentioned above, the computing device 250 may be included in the remote system 210 and/or may be communicatively connected to the wireless gateways 205A, 205B, the field gateway 212, the data diode 215, or the edge gateway 218.

At block 582, historical process parameter values (e.g., historical valve parameter values) are obtained for one or more process parameters (e.g., one or more valve parameters) corresponding to one or more valves. Each of the historical process parameter values includes a corresponding timestamp and an indication of the mode of operation for a corresponding valve when the historical process parameter value was generated. Each of historical process parameter values or a set of historical process parameter values corresponding to a particular time window (e.g., an hour) associated with a particular mode of operation of a corresponding valve is classified into a respective subset of process parameter values (block 584). For example, a historical process parameter value may be classified into a first subset of process parameter values associated with a full stroke cycling mode, a second subset of process parameter values associated with a continuous throttling mode, or a third subset of process parameter values associated with a periodic throttling mode.

At a block 586, a statistical model is generated based on the subsets of historical process/valve parameter values, e.g., by using various machine learning techniques. The machine learning techniques may include linear regression, polynomial regression, logistic regression, naïve Bayes, decision trees, random forests, boosting, nearest neighbors, neural networks, etc. In some embodiments, a single statistical model is generated for multiple modes of valve operation. In other embodiments, a different statistical model is generated for each mode of valve operation. In yet other embodiments, process parameter metrics generated from the historical process parameter values over time (e.g.., averages, moving averages, etc., such as described above) are compared with multiple statistical models indicative of various modes of valve operation to determine which mode-specific statistical model most closely corresponds to the process parameter metrics. For example, a respective measure of similarity or difference may be generated for each mode-specific statistical model (with respect to the process parameter metrics) and compared to determine an appropriate mode-specific statistical model.

In any event, at block 588, valve data for a subject valve is received in a secure manner. For example, the valve data may be transmitted to the computing device 250 via a data diode, using firewalls, encryption techniques, and/or any other suitable security mechanisms. Valve data includes process parameter values corresponding to the valve, such as values corresponding to a drive signal, a valve travel measurement, a travel set point, an actuator pressure, etc. For each process parameter, the computing device 250 receives several process parameter values obtained at several instances of time. Each process parameter value includes a corresponding timestamp indicative of when the process parameter value was generated, for instance.

One or several process parameter metrics may be generated for each process parameter based on the corresponding time-series process parameter values of the subject valve. Example process parameter metrics include an average valve travel per reversal, a moving average valve travel per reversal, a decaying valve travel per reversal, a standard deviation of the valve travel, a number of reversals per time period, an amplitude, phase, and/or frequency of a wave corresponding to the valve travel over time, etc.

One or more of the process parameter metrics are compared to the statistical model(s) (block 590) to detect or identify the mode of operation of the subject valve (block 592). For example, when a statistical model is generated by naïve Bayes, one or more process parameter metrics are compared to a distribution for a subset of process parameter values associated with the full stroke cycling mode, another distribution for a subset of process parameter values which are associated with the continuous throttling mode, and yet another distribution for a subset of process parameter values which are associated with the periodic throttling mode. The computing device 250 determines which distribution most closely matches with the process parameter metrics and identifies the mode of operation of the subject valve accordingly. In another example, when a statistical model is generated by decision trees, random forests, or boosting, the computing device 250 traverses the nodes of the decision trees using the process parameter metrics to determine the mode of operation of the subject valve.

Based on the identified mode of operation of the subject valve, the computing device 250 performs respective analytics to detect or identify a condition, if any, occurring or that is present at the subject valve. For example, when the identified mode of valve operation is periodic throttling, the computing device 250 performs analytics for example, using a statistical model generated based on historical process parameter values of valves operating in the periodic throttling mode to detect or identify a condition, if any, occurring at the valve (block 594a). When the identified mode of operation is continuous throttling, the computing device 250 performs analytics for example, using a statistical model generated based on historical process parameter values of valves operating in the continuous throttling mode (block 594b). When the identified mode of operation is full stroke cycling, the computing device 250 performs analytics for example, using a statistical model generated based on historical process parameter values of valves operating in the full stroke cycling mode (block 594c).

In some embodiments, a mode determination application or module within the computing device 250 transmits an indication of the determined mode of operation to the user interface device 235, to another application or module in the computing device 250, and/or to another computing device. The other application, module, or computing device performs respective analytics for example, using the machine learning techniques and/or statistical models such as those discussed above to detect or identify a condition, if any, occurring or present at the subject valve.

At block 596, a condition of the valve is detected or identified, e.g. by using the statistical models generated for the same mode of operation as that identified for the valve. For example, for a statistical model corresponding to the identified mode of valve operation and generated by using naïve Bayes, process parameter metrics of the subject valve are compared to a distribution for a subset of process parameter values associated with a condition and are compared to another distribution for a subset of process parameter values which are not associated with the condition. The computing device 250 determines which distribution is more closely matched with the process parameter metrics and identifies whether or not the subject valve is experiencing the condition accordingly. In another example, for a statistical model corresponding to the identified mode of valve operation and corresponding to decision trees, random forests, or boosting, the computing device 250 traverses the nodes of the decision trees using the process parameter metrics of the subject valve to determine which conditions, if any, the subject valve is experiencing. In yet another example, for statistical model corresponding to the identified mode of valve operation and generated using a regression analysis, such as logistic regression, linear regression, polynomial regression, etc., the computing device 250 applies the process parameter metrics of the subject valve to the corresponding regression equation to detect or identify a performance monitoring metric or other condition of the valve.

At a block 598, the computing device 250 transmits an indication of the detected/identified condition to a user interface device 235, e.g. to alert an operator to the condition. An indication of the condition may be an alarm or an error message including the type of condition detected (e.g., dead band, mechanical wear, etc.), and identification of the valve experiencing the condition, the process or valve parameter values used to detect the condition, steps to resolve potential issues created by the condition, and/or any other suitable information.

In some embodiments, the computing device 250 causes an alarm or event to be generated at the process plant 100 according to the detected/identified condition of the valve. For example, the computing device 250 transmits a communication to the process plant 100 to activate an alarm or event for the valve, or transmits a request to the user interface device 235 to transmit a respective communication to the process plant 100 to activate the alarm or event for the valve. In other embodiments, the computing device 250 transmits a control signal to the process plant 110 to adjust operation of the valve and/or in operation of the process plant based on the identified condition. For example, when the valve is experiencing a leak, the computing device 250 transmits a control signal to the process plant 110 to shut down operation of the valve.

Additionally or alternatively, the computing device 250 transmits the indication of the condition to another computing device, service, or application (e.g., for further analysis). For example, a condition determination application or module within the computing device 250 detects or identifies a condition of a process plant entity and transmits an indication of the identified condition to another application or module in the computing device 250 or another computing device. The other application or module may perform additional analytics, for example to detect the health of the process plant entity relative to other process plant entities in the same process plant 100, enterprise, industry, etc. as described in more detail below with reference to FIGS. 7A-7B. The other application or module detects a condition of the process plant entity based on the relative health of the process plant entity.

In some embodiments, the condition determined based on the relative health of the process plant entity is compared to the condition determined based on the machine learning methods. When the condition determined based on the relative health indicator for the process plant entity and the condition determined based on the machine learning methods are not in agreement, the other application or module performs further analysis to detect or identify the condition occurring at the process plant entity and/or transmits indications of the conditions and relevant process parameter metrics to an operator for further review.

It is noted that while the methods 550, 580 illustrated in FIGS. 6B and 6C detect or identify three modes of operation for the valve (full stroke cycling, continuous throttling, and periodic throttling) additional, alternative, or any suitable number of modes of operation may be identified.

To further enhance the statistical analysis of the valves, valve data of a particular valve may be compared to valve data for several other valves in the same process plant, enterprise, industry, or across all industries. In this manner, the health of the particular valve is identified relative to other currently operating valves in addition to historical process parameters. In some embodiments, the health of the particular valve is ranked amongst each of the valves operating in the same process plant, enterprise, industry, or across all industries.

For example, based on the comparison of process parameter values corresponding to the valve to historical process parameter values, e.g. by using the statistical models, the computing device 250 determines that a particular condition (e.g., an error) is occurring or is present at the particular valve. However, the particular valve may rank in the middle of the valves in the process plant according to an overall device health parameter for each of the valves or some other process parameter related to the error condition. As such, based on the overall device health parameters of the valves, the computing device 250 determines that the particular valve is operating normally when compared with the other valves in the process plant.

Figure 7A:
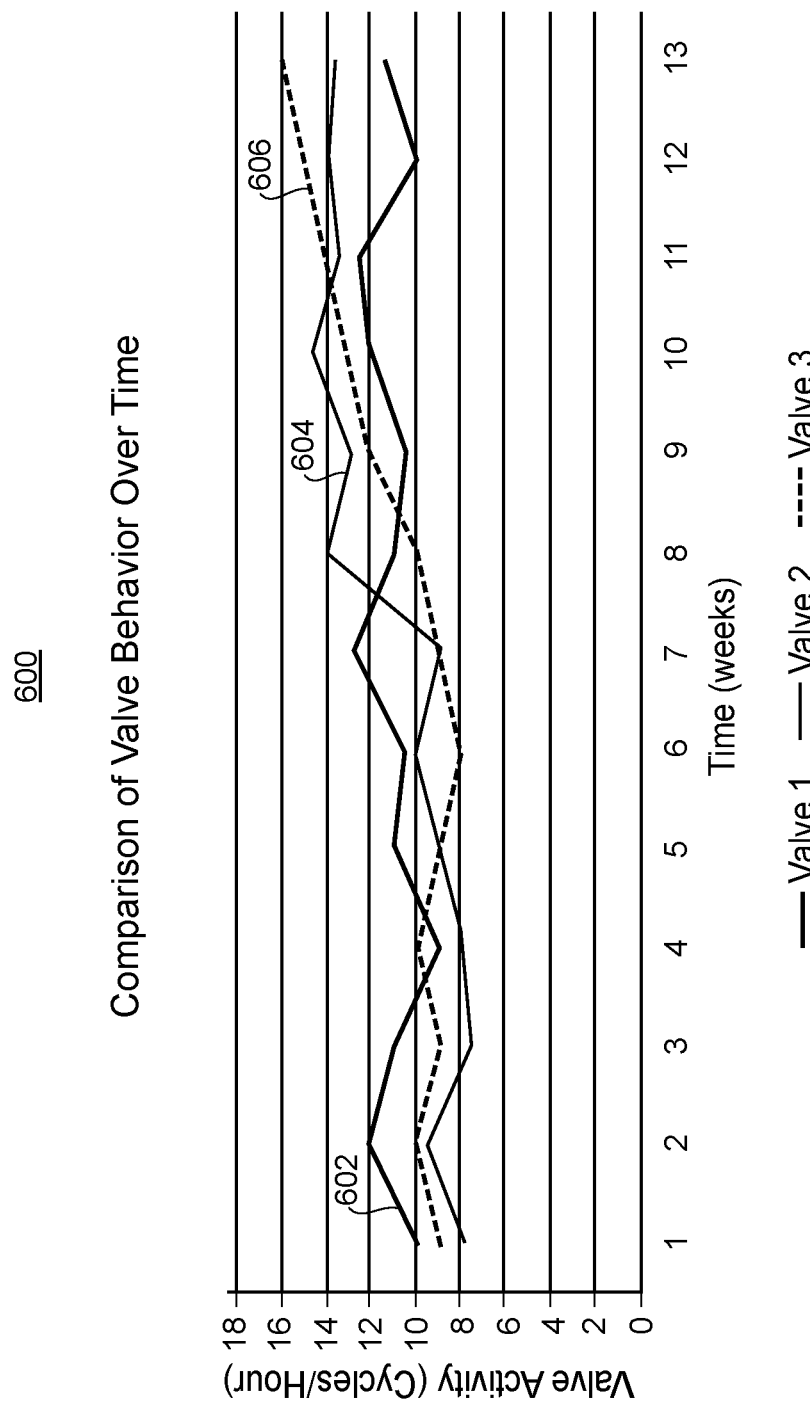
FIG. 7A is an example graphical depiction of valve cycles collected over time for three different valves.

To illustrate, FIG. 7A illustrates an example graphical depiction 600 of valve cycles collected over time for three different valves, where a cycle represents a reversal in the valve travel direction (e.g., from opening to closing or from closing to opening). In this example, the valve cycle is used to generate an overall device health parameter for comparing each of the valves 602-606 operating in the same process plant 100, enterprise, industry, or across all industries. However, this is merely one example and additional or alternative process parameters or process parameter metrics may be used to generate overall device health parameters.

In any event, for the first valve 602, the amount of valve cycles is consistent over the 13 week time span averaging about 11 cycles per hour the entire time. While the values vary from about 10 cycles per hour to about 12 cycles per hour, the average slope or change in the cycles per hour is nearly flat. For the second valve 604, the amount of valve cycles is consistent at about 9 cycles per hour until week 7. Then the amount of valve cycles increases from week 7 to week 8 before leveling off at a consistent value of about 14 cycles per hour from weeks 8 to 13. This may indicate a change in process parameter values or a mechanical change in the valve, such as mechanical wear. For the third valve 606, the amount of valve cycles is consistent at about 9.5 cycles per hour until about week 7. Then the amount of valve cycles gradually increases over time through week 13 to about 16 cycles per hour.

Accordingly, the computing device 250 determines a relative health indicator for each valve 602, 604, 606 by comparing the respective overall device health parameter of the valve to the overall device health parameters of the other valves. The relative health indicator of a valve may be an indication of where the valve ranks amongst the other valves, an overall device health parameter percentile amongst the overall device health parameters for the valves, or some other suitable indicator.

For example, the computing device 250 may rank the first valve 602 the highest or assign the highest overall device health parameter to the first valve 602, because the valve cycles per week of the first valve 602 are the most consistent. The second valve 604 may be ranked second over the third valve 606 because while the amount of valve cycles increase over time for both fell 604 and valve 606, the amount of valve cycles levels off in the second valve 604 whereas the amount of valve cycles continues to increase over time in the third valve 606.

In some embodiments, the graphical depiction 600 is transmitted to a user interface device 235 for display at a user interface, e.g., of the user interface device 235 and/or of the operator workstation 171. Additionally or alternatively, the data included in the graphical depiction 600 is analyzed by the computing device 250. In some embodiments, the corresponding relative device health indicators (e.g., overall device health parameters or rankings) for each of the valves 602-606 are transmitted for display at a user interface, e.g., of the user interface device 235 and/or of the operator workstation 171.

An overall device health parameter for each of the valves 602-606 may be determined according to the change in the average valve cycles per hour over time. Conditions occurring at the valves are also determined or adjusted based on the analysis and are transmitted to the user interface device 235.

For example, for the second valve 604, the computing device 250 analyzes process parameter values corresponding to the second valve 604 e.g., by using the machine learning techniques mentioned above. The computing device 250 also determines the mode of operation for the second valve 604, e.g. by using the techniques mentioned above, and identifies an appropriate statistical model to apply to the process parameter values to detect or identify a condition occurring at the second valve 604. If, based on the applied statistical model, the computing device 250 determines that the second valve 604 is experiencing mechanical wear, the relative device health indicator (e.g., overall device health parameter or side-by-side comparison of the second valve 604 to other valves 602, 606) may be utilized to affirm that the second valve 604 is indeed experiencing mechanical wear. On the other hand, the relative device health indicator (e.g., overall device health parameter or side-by-side comparison of the first valve 602 to other valves 604, 606) may suggest that the first valve 602 is relatively healthy compared to the other valves 604, 606 even though the result of the application of the statistical model indicates that the valve 604 is experiencing some amount of mechanical wear. This learned information may be provided to an operator and/or to another application or service for further analysis.

Figure 7B:
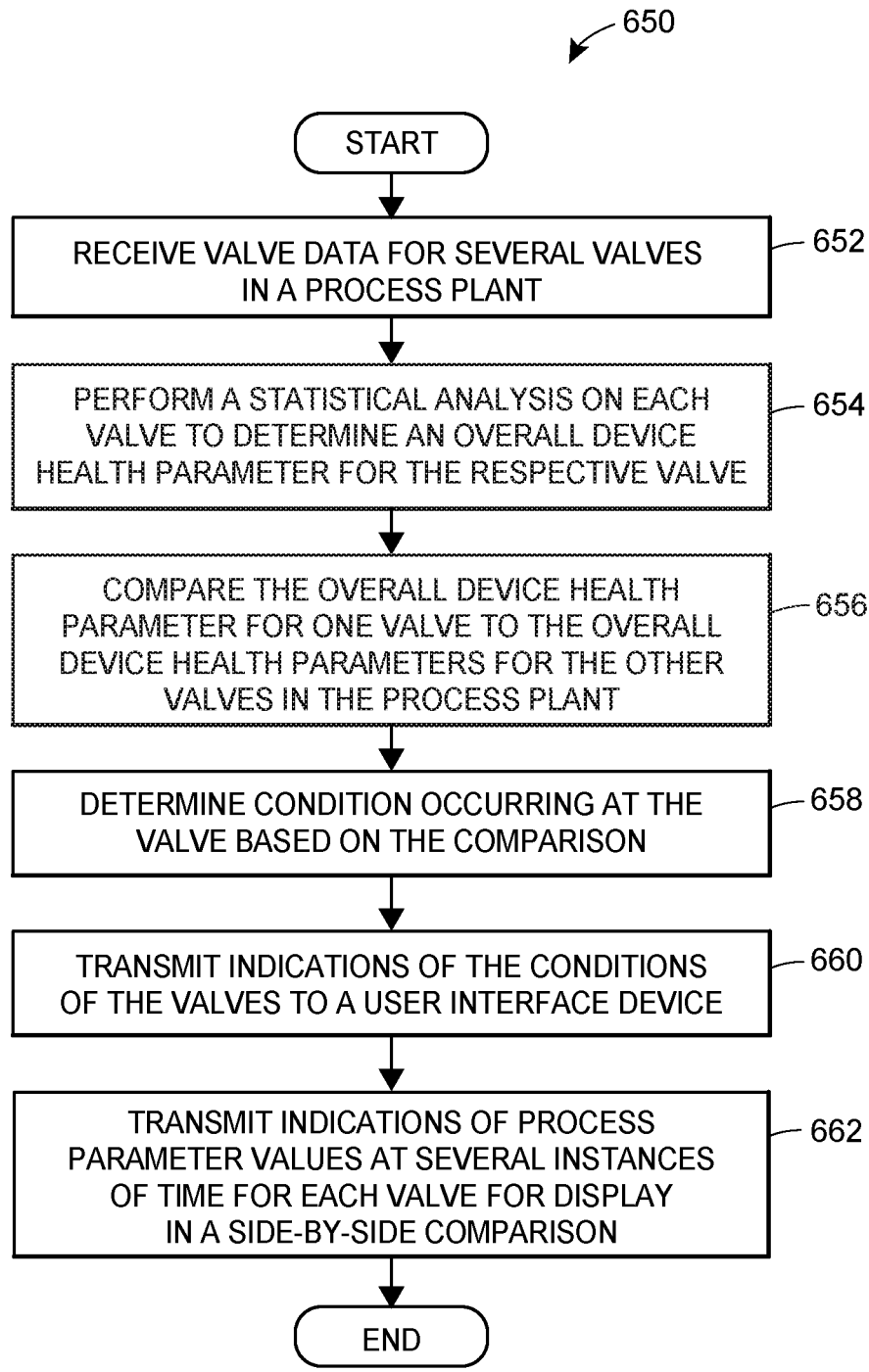
FIG. 7B is a flow diagram representing an exemplary method for comparing the health of several valves to each other and detecting or identifying respective conditions of the valves based on the comparison.

FIG. 7B depicts a flow diagram representing an exemplary method 650 for comparing the health of several valves and detecting/identifying respective conditions of the valves based on the comparison. The method 650 may be executed by the computing device 250 as shown in FIG. 3, or by any suitable computing device. As mentioned above, the computing device 250 may be included in the remote system 210 and/or may be communicatively connected to the wireless gateways 205A, 205B, the field gateway 212, the data diode 215, or the edge gateway 218.

At block 652, process parameter values (e.g., valve parameter values) of multiple valves are received in a secure manner. For example, the process or valve parameter values may be transmitted to the computing device 250 via a data diode, using firewalls, encryption techniques, and/or any other suitable security mechanisms. The multiple valves may be included in the same process plant 100, enterprise, industry, or across all industries. For example, the process parameters for valves external to the process plant 100 are received from the gateways 176, 178 to systems that are external to the immediate process control system 100.

For each process or valve parameter, the computing device 250 receives several process parameter values generated at several instances of time. Each process/valve parameter value includes a corresponding timestamp indicative of when the process parameter is generated, for example. The process/valve parameters used for comparing the health of valves may include the same set of process parameters used to detect or identify a condition occurring at a valve (e.g., as described in method 400 of FIG. 5), a different set of process parameters used to detect or identify the condition occurring at a valve, or an overlapping set of process parameters where some process parameters in the set are the same and others are different. Example process parameters for the valve include valve travel, a drive signal for the valve, a valve travel set point, an actuator pressure, etc.

In some embodiments, for each of the multiple valves, the computing device 250 determines one or more respective process parameter metrics for each process parameter based on the corresponding process parameter values over time. Process parameter metrics include, for example, an average valve travel per reversal, a moving average valve travel per reversal, a decaying valve travel per reversal, a standard deviation of the valve travel, a number of cycles per time period as in FIG. 7A, an amplitude, phase, and/or frequency of a wave corresponding to the valve travel over time, etc.

At a block 654, a statistical analysis is performed on the process parameter metrics of each valve to determine an overall device health parameter for the valve. In some embodiments, the overall device health parameter may be determined by applying a set of rules to the process parameter metrics. For example, as described with reference to FIG. 7A, an overall device health parameter is assigned to each valve according to the change in average valve cycles per hour over time, where the overall device health parameter decreases as the change in average valve cycles per hour increases.

In other embodiments, the overall device health parameter is determined using one or more machine learning techniques, similar to the machine learning techniques described above. For example, the one or more machine learning technique may include a regression analysis, such as logistic regression, linear regression, polynomial regression, etc. Additionally, each of the historical process parameter values for process parameters corresponding to valves is assigned an overall device health parameter according to the health status of the corresponding valve.

Based on the historical process parameter values and corresponding overall device health parameters, the computing device 250 generates a statistical model as an equation which most closely approximates the overall device health parameters from the historical process parameter values. In some embodiments, an ordinary least squares method is used to minimize the difference between the value of predicted overall device health parameters using the statistical model and the actual overall device health parameters assigned to the historical process parameter values. Additionally, the differences between the values of each predicted overall device health parameter ($\hat{y}_i$) using the statistical model and overall device health parameter ($y_i$) are aggregated and/or combined in any suitable manner to determine a mean square error (MSE) of the regression. The MSE then is used to determine a standard error or standard deviation ($\sigma_\varepsilon$) in the statistical model, which in turn is used to create confidence intervals.

Using the statistical model, the computing device 250 applies the process parameter metrics to the equation generated as a result of the regression analysis. As a result, the computing device 250 identifies an overall device health parameter for the valve. This is repeated for each of the valves to determine an overall device health parameter for each valve.

Using the overall device health parameters (e.g., average valve cycles per time period over time, etc.), the computing device 250 compares the overall device health parameter for one valve to the overall device health parameters for the other valves in the same process plant 100, enterprise, industry, or across all industries. Based on the comparison, the computing device 250 determines a relative health indicator for each valve. For example, in some embodiments, the valves are ranked based on their corresponding overall device health parameters. In other embodiments, the valves are ranked based on a particular process parameter or process parameter metric and several rankings of the valves are generated for several process parameters and/or process parameter metrics.

In other embodiments, the computing device 250 determines an average and a standard deviation of the overall device health parameters for each of the valves. Then assuming a Gaussian distribution or any other suitable probability density function, the computing device 250 determines an overall device health parameter percentile for each of the valves as the relative health indicator for each valve. For example, a valve having an overall device health parameter which is equivalent to the average overall device health parameter may be in the $50^{th}$ percentile. Another valve having an overall device health parameter which is 2 standard deviations about the average overall device health parameter may be in the $98^{th}$ percentile and yet another valve having an overall device health parameter which is 1 standard deviation below the average overall device health parameter may be in the $16^{th}$ percentile.

Then at block 658, a condition occurring at the valve is determined based on the relative health indicator for the valve. In some embodiments, a particular process parameter or process parameter metric is indicative of a particular type of condition. For example, a valve ranked near the bottom of the valves according to change in average valve cycles per hour over time is likely to experience mechanical wear.

Moreover, a valve ranked near the bottom of the valves according to the amount of dead time or dead band is likely to experience excessive dead time or dead band. Still further, a valve ranked near the bottom of the valves according to the difference between the valve travel set point and the measured valve travel is likely to experience an error.

In other embodiments, the relative health indicator for the valve is used in conjunction with the machine learning methods (such as the method 400 in FIG. 5) to detect or identify a condition occurring at the valve. For example, when the condition determined based on the relative health indicator for the valve and the condition determined based on the machine learning methods are in agreement, the computing device 250 determines that the condition determined based on the machine learning methods is accurate. On the other hand, when the condition determined based on the relative health indicator for the valve and the condition determined based on the machine learning methods are not in agreement, the computing device 250 performs further analysis to detect or identify the condition occurring at the valve and/or transmits indications of the conditions and relevant process parameter metrics to an operator for further review. In other embodiments, the condition determined based on the relative health indicator for the valve overrides the condition determined based on the machine learning methods. As a result, the computing device 250 transmits an indication of the condition determined based on the relative health indicator for the valve to the user interface device 235 to alert an operator of the condition.

For example, when the valve data is compared to a statistical model generated using historical process parameter values, the computing device 250 determines that the valve is experiencing excessive dead time. However, when the valve is compared to all other valves in the same industry, the computing device 250 determines that the dead time the valve is experiencing is about average within the industry and therefore the dead time is within an acceptable range.

In another example, when the valve data is compared to a statistical model generated using historical process parameter values, the computing device 250 determines that the amount of dead band for the valve is within an acceptable range. However, when the valve is compared to all other valves in the same industry, the computing device 250 determines that the amount of dead band for the valve is in the 99$^{th}$ percentile compared to the other valves in the same industry. Thus, the computing device 250 determines that the valve is experiencing excessive dead band. Accordingly, the computing device 250 transmits an indication of the excessive dead band condition to the user interface device 235, causes an alarm or event to be generated at the process plant 100 which indicates excessive dead band at the valve, or transmits a control signal to the process plant 110 to adjust operation of the valve based on the excessive dead band. For example, the control signal may be an instruction to shut down the valve.

At block 660, indications of the conditions of the valves are transmitted to a user interface device 235 to alert an operator of the conditions. In some embodiments, the relative health indicators for each valve are also transmitted to the user interface device 235. For example, the overall device health parameters as well as the ranking of each valve according to the overall device health parameters are transmitted to the user interface device 235. An indication of the condition may be an alarm or an error message including the type of condition detected (e.g., dead band, mechanical wear, etc.), the valve experiencing the condition, the process parameter values used to detect the condition, steps to resolve potential issues created by the condition, or any other suitable information.

In some embodiments, the computing device 250 also causes alarms or events to be generated at the process plant 100 according to the identified conditions for the valves. For example, the computing device 250 transmits a communication to the process plant 100 to display alarms or events for the valves or transmits a request to the user interface device 235 to transmit the communication to the process plant 100 to display the alarms or events for the valves. In other embodiments, the computing device 250 transmits a control signal to the process plant 110 to adjust operation of the valves based on the identified conditions. For example, when a valve is experiencing a leak, the computing device 250 transmits a control signal to the process plant 110 to shut down operation of the valve.

Additionally at block 662, for each valve, indications of the process parameter values at several instances of time are transmitted to the user interface device 235 for display in a side-by-side comparison. For example, the graphical depiction 600 as shown in FIG. 7A may be transmitted to the user interface device 235. In this manner, the operator can view changes in the process parameter values over time for each of the valves and can compare the valves.

Figure 8:
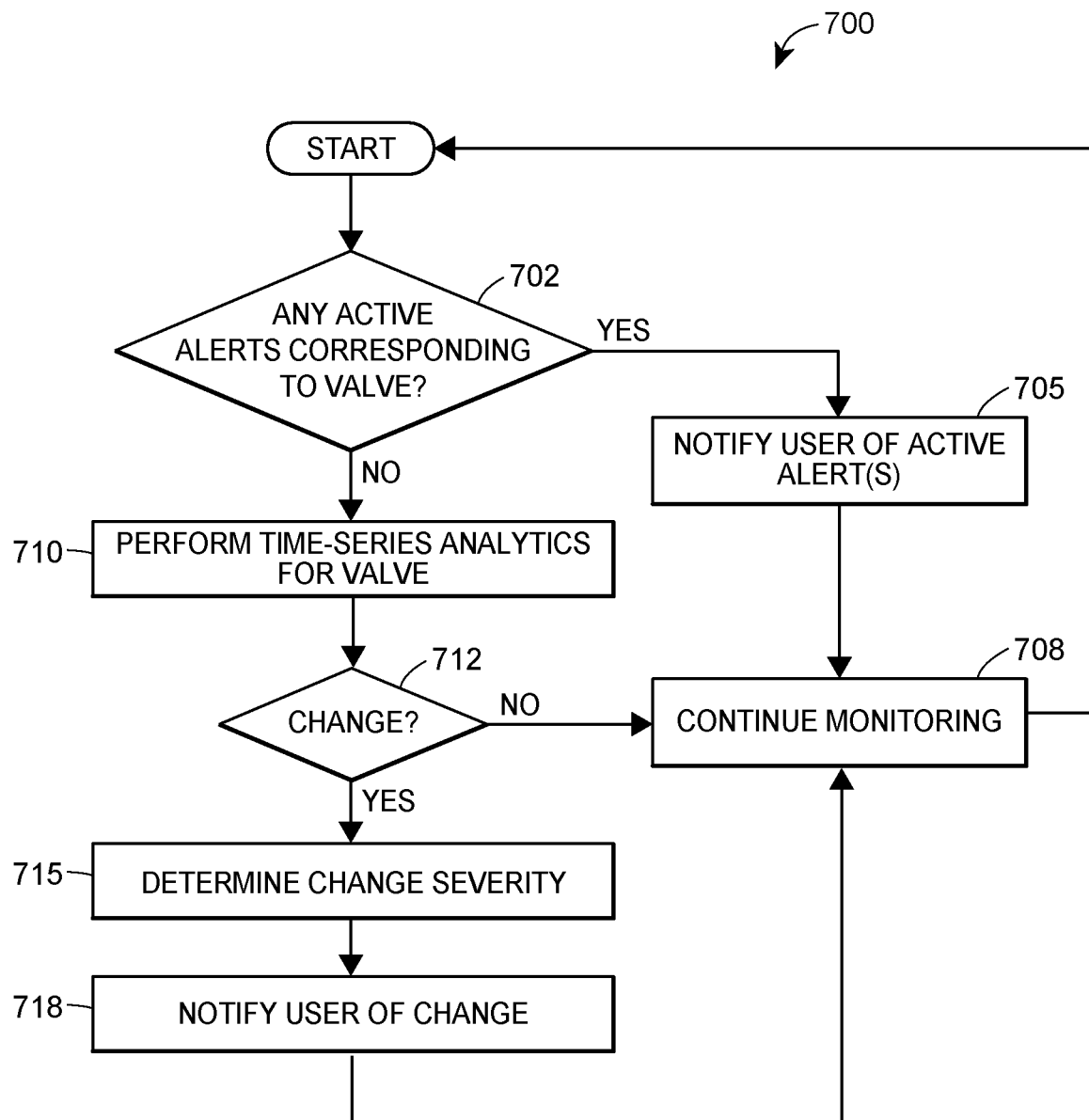
FIG. 8 is a flow diagram of an exemplary method for monitoring the health and/or performance of a valve or other process plant entity.

Turning now to FIG. 8, FIG. 8 is a flow diagram of an exemplary method 700 for monitoring the health and/or performance of a valve or other process plant entity. In an embodiment, at least a portion of the method 700 is performed by the computing device 250 and/or by a remote application or service 208. In some embodiments, at least a portion of the method 700 is performed by another computing device that is disposed locally with respect to the process plant 100, for example, at a computing device that is communicatively connected to the data highway 110. Notably, though, the method 700 may operate in conjunction with any of the techniques, methods, systems, devices, and/or apparatuses described herein.

Generally speaking, the method 700 is directed to monitoring a valve or other target process entity continuously and/or periodically, and executes while the valve is operating to control a process in the process plant 100. As such, for illustration and not limitation purposes, the method 700 is described with respect to a monitored valve. The frequency at which the method 700 is (re-)executed may be predetermined, and/or may be based on a criticality of the valve, for example. Of course, in addition to recurring execution, an execution of the method 700 may be initiated based on a trigger such as an event that occurs within the process plant 100, and/or a user request or command.

At any rate, at a block 702, the method 700 includes determining whether or not any alerts corresponding to the valve are active. If, at the block 702, the method 700 determines that there are active alerts corresponding to the valve, the method includes notifying a user, e.g. by transmitting an indication of the active alert(s) to a user interface at an operator workstation 170 and/or at the user interface device 235 (block 705). A respective priority of each active alert may be transmitted in conjunction with the active alert notification (block 705), if desired. The respective priority may be determined based on a level of the active alert and a measure or other indication of criticality of the valve, for example. Upon completion of the user notification (block 705), the method 700 continues monitoring the health and/or performance of the valve (block 708), and returns to the block 702.

If, at the block 702, the method 700 determines that there are not any active alerts corresponding to the valve, the method 700 proceeds to perform one or more time-series analytics for the valve (block 710). For example, at the block 710, the method 700 may include obtaining time-series valve data corresponding to the valve, generating one or more process plant metrics based on the time-series valve data, and comparing the generated process plant metrics with one or more statistical models, e.g., in a manner such as that previously described with respect to FIG. 5. In some cases, the time-series analytics for the valve may be based on a detected mode of operation of the valve, e.g., such as previously described with respect to FIG. 6C. Examples of time-series analytics that may be performed for the valve (block 710) include determining slopes and/or trends, determining averages and other metrics, determining standard deviations and/or variances, comparing valve data to various thresholds, and/or other analytics. In an embodiment, the block 710 includes determining a value or measure of an overall device health of the valve and/or a value or measure of a relative health indicator of the valve, e.g., such as previously described with respect to FIG. 7B.

At a block 712, the method 700 includes determining whether or not a change in one or more results of the executed time-series analytics at the block 710 has occurred or is observed. For example, the results of the most recently executed time-series analytics (block 710) may be compared with historical time-series analytics results of the valve and/or of similar valves, and/or one or more time-series analytics results may correspond to one or more monitored valve parameters. The presence of a change in a valve parameter value and/or to a result of a time-series analytic may be determined based on an amount of deviation from a threshold or baseline (e.g., an expected value and/or behavior over time) for example, and the amount of deviation indicative of the presence of a change may be configurable, if desired. Examples of changes that may be monitored (block 712) include changes to drive signals, travel deviation, cycles and/or travel metrics, supply pressure, and/or other time-series analytics results corresponding to valves.

If, at the block 712, the method 700 determines that a change has not occurred and/or is not observed, the method 700 continues to monitor the health and/or performance of the valve (block 708), and returns to the block 702. If, at the block 712, the method 700 determines that a change has occurred and/or is observed, the method 700 optionally includes determining a level or measure of severity of the change (block 715). The determination of the severity of the change may be based on a significance of the parameter value and/or time-series analytics result that has changed, a magnitude of change of the parameter value/time-series analytics result, a criticality of the valve, and/or on other factors.

At a block 718, the method 700 includes notifying a user of the change in the valve parameter and/or time-series analytics result and optionally its respective severity. For example, a notification of the change and its severity may be transmitted to a user interface at an operator workstation 170 and/or at a user interface device 235. Upon completion of the user notification of the change (block 718), the method 700 continues to monitor the health and/or performance of the valve (block 708), and returns to the block 702.

Embodiments of the techniques described in the present disclosure may include any number of the following aspects, either alone or combination:

1. A method for detecting a condition of a process plant entity by using data that is securely transported from a process plant to a cloud computing system, the method comprising: receiving, at the cloud computing system, data generated by one or more devices of the process plant while the process plant is operating to control an industrial process, the data secured for transmission from the one or more devices to the cloud computing system via a data diode, and the data diode configured to prevent two-way communications between a network of the process plant and a network of the cloud computing system; analyzing, at the cloud computing system, the data, thereby detecting a condition of a process plant entity performing a physical function to control the industrial process in the process plant, the process plant entity corresponding to the one or more devices; and transmitting an indication of the condition of the process plant entity to a user interface device to alert an operator to the condition.

2. The method of aspect 1, wherein receiving the data generated by the one or more devices includes receiving, at a plurality of instances of time, respective process parameter values for each of one or more process parameters of the process plant entity.

3. The method of any one of the previous aspects, wherein analyzing the data thereby detecting the condition of the process plant entity includes: for the each of the one or more process parameters, combining the respective process parameter values of the one or more process parameters over the plurality of instances of time to generate a process parameter metric; and detecting the condition of the process plant entity based on the process parameter metric.

4. The method of any one of the previous aspects, wherein combining the respective process parameter values of the one or more process parameters over the plurality of instances of time to generate the process parameter metric includes calculating at least one of: a moving average of the respective process parameter values or a decaying average of the respective process parameter values over the plurality of instances of time to generate the process parametric metric.

5. The method of any one of the previous aspects, further comprising generating a statistical model based on historical process parameter values of the one or more process parameters; and wherein detecting the condition of the process plant entity based on the process parameter metric comprises applying the process parameter metric to the statistical model.

6. The method of any one of the previous aspects, wherein generating the statistical model based on the historical process parameter values of the one or more process parameters comprises: classifying each historical process parameter value as corresponding to a first set of process parameter values for one or more process plant entities that have experienced the condition or as corresponding to a second set of process parameter values for one or more process plant entities that have not experienced the condition; and generating the statistical model based on the classifications of the historical process parameter values.

7. The method of any one of the previous aspects, further comprising: receiving an indication of whether or not the process plant entity has experienced the condition; and updating the historical process parameter values to include the respective process parameter values of the one or more process parameters of the process plant entity and based on the indication of whether or not the process plant entity has experienced the condition.

8. The method of any one of the previous aspects, wherein detecting the condition of the process plant entity includes at least one of: detecting a performance monitoring metric of the process plant entity, or detecting at least one of: an error, dead band, dead time, or a leak at the process plant entity.

9. The method of any one of the previous aspects, further comprising causing an alarm or an event to be generated at the process plant based on the detected condition of the process plant entity.

10. The method of any one of the previous aspects, further comprising transmitting a control signal to the process plant to adjust an operation of the process plant entity based on the detected condition of the process plant entity.

11. The method of any one of the previous aspects, wherein receiving data generated by the one or more devices includes receiving real-time data streamed from the one or more devices to the cloud computing system via the data diode.

12. The method of any one of the previous aspects wherein the process plant entity includes at least one of: a valve, an actuator, a tank, a mixer, a pump, a heat exchanger, a field device, an I/O device, a controller, or another device that performs a physical function to control an industrial process in the process plant.

13. The method of any one of the previous aspects, wherein the one or more devices includes at least one of: one or more devices included in the process plant entity, a field device, an I/O device, a controller, a node, a communication device, an adaptor, a router, a gateway, or another device disposed in the process plant.

14. The method of any one of the previous aspects, further comprising determining an operating mode of the process plant entity, and wherein analyzing the data comprises analyzing the data utilizing a technique or model corresponding to the operating mode of the process plant entity.

15. A system for detecting a condition of a process plant entity of a process plant, the system comprising:
one or more devices corresponding to a process plant entity disposed in the process plant and performing a physical function to control an industrial process;
a data diode communicatively connecting the one or more devices to one or more computing devices, the data diode configured to prevent two-way communications between a network of the process plant and the one or more computing devices; and
the one or more computing devices comprising: one or more processors; a communication unit; and one or more non-transitory computer-readable media coupled to the one or more processors and to the communication unit, the one or more non-transitory computer-readable media storing instructions thereon that, when executed by the one or more processors, cause the computing device to:
receive, via the data diode and the communication unit, data generated by the one or more devices of the process plant while the process plant is on-line, the data secured for transmission from the one or more devices to the computing device via the data diode; analyze the data to detect a condition of the process plant entity; and transmit, via the communication unit to a user interface device, an indication of the condition for the process plant entity to alert an operator to the condition.

16. The system of the previous aspect, wherein the data generated by the one or more devices includes respective process parameter values for each of one or more process parameters of the process plant entity at a plurality of instances of time.

17. The system of any one of aspects 15-16, wherein: the analysis of the data to detect the condition of the process plant entity includes a combination of the respective process parameter values of the one or more process parameters over the plurality of instances of time to generate one or more process parameter metrics; and the condition of the process plant entity is detected based on the one or more process parameter metrics.

18. The system of any one of aspects 15-17, wherein the combination of the respective process parameter values comprises at least one of: a moving average of the respective process parameter values or a decaying average of the respective process parameter values.

19. The system of any one of aspects 15-18, further comprising a statistical model generated based on historical process parameter values of the one or more process parameters; and wherein the condition of the process plant entity is detected by applying the one or more process parameter metrics to the statistical model.

20. The system of any one of aspects 15-19, wherein the statistical model is generated based on a classification of each historical process parameter value as corresponding to a first set of process parameter values of one or more process plant entities that have experienced the condition or as corresponding to a second set of process parameter values of one or more process plant entities that have not experienced the condition.

21. The system of any one of aspects 15-20, wherein the statistical model is generated by using one or more machine learning techniques, the one or more machine learning techniques including: linear regression, polynomial regression, logistic regression, naïve Bayes, decision trees, random forests, boosting, nearest neighbors, or neural networks.

22. The system of any one of aspects 15-21, wherein the one or more process parameters are indicative of at least one of: a pressure, a temperature, a flow rate, a density, an area, or a volume.

23. The system of any one of aspects 15-22, wherein the condition of the process plant entity includes at least one of: a performance monitoring metric, an error, dead band, dead time, or a leak at the process plant entity.

24. The system of any one of aspects 15-23, wherein the one or more devices include at least one of: a field device or a controller executing a control routine that utilizes signals that are at least one of generated by or sent to the field device.

25. The system of any one of aspects 15-24, wherein the process plant entity includes at least one of: a valve, a field device, an I/O device, a controller coupled to the field device via the I/O device, tank, a mixer, a pump, or a heat exchanger.

26. The system of any one of aspects 15-25, further configured to perform the method of any one of aspects 1-14.

27. A method for detecting a mode of operation of a valve in a process plant, the method comprising: receiving, at a computing device, data generated as a result of the valve operating within the process plant to control an industrial process, the valve data including respective valve parameter values of the valve for one or more valve parameters over a plurality of instances of time; analyzing, by the computing device, the valve data to identify, from a plurality of modes of valve operation, a mode of operation of the valve, the plurality of modes of valve operation including two or more of: full stroke cycling, continuous throttling, or periodic throttling; and transmitting an indication of the identified mode of operation of the valve to at least one of a user interface or another application for analyzing operations in the process plant.

28. The method of the previous aspect, wherein the respective valve parameter values are a first set of valve parameters, and the method further comprises: selecting, based on the identified mode of operation of the valve, a second set of valve parameters; analyzing a second set of valve parameter values of the second set of valve parameters over the plurality of instances of time, thereby detecting a condition of the valve, the second set of valve parameter values included in the valve data; and transmitting an indication of the detected condition of the valve to the user interface.

29. The method of any one of aspects 27-28, wherein analyzing the second set of valve parameter values over the plurality of instances in time thereby detecting the condition of the valve includes: combining the second set of valve parameter values over the plurality of instances of time to generate one or more valve parameter metrics; and detecting the condition of the valve based on the one or more valve parameter metrics.

30. The method of any one of aspects 27-29, further comprising generating a statistical model based on historical valve parameter values for the second set of valve parameters, the historical valve parameter values generated by one or more valves operating in the identified mode of operation of the valve; and wherein detecting the condition of the valve based on the one or more valve parameter metrics comprises applying the one or valve parameter metrics to the statistical model.

31. The method of any one of aspects 27-30, wherein generating the statistical model includes generating the statistical model using one or more machine learning techniques, the one or more machine learning techniques including at least one of: linear regression, polynomial regression, logistic regression, naïve Bayes, decision trees, random forests, boosting, nearest neighbors, or neural networks.

32. The method of any one of aspects 27-31, further comprising causing an alarm or an event to be generated at the process plant based on the detected condition of the valve.

33. The method of any one of aspects 27-32, wherein detecting the condition of the valve includes at least one of: determining a performance metric for the valve, or detecting at least one of: an error, dead band, dead time, or a leak at the valve.

34. The method of any one of aspects 27-33, wherein analyzing the valve data to identify the mode of operation of the valve includes: combining the respective valve parameter values of the valve over the plurality of instances of time to generate a valve parameter metric of the valve; comparing the valve parameter metric of the valve to a plurality of statistical models respectively corresponding to the plurality of modes of valve operation, each statistical model corresponding to a respective mode of valve operation and generated based on respective historical valve parameter values of one or more valves operating in the respective mode of valve operation; and identifying the mode of operation of the valve based on the comparison.

35. The method of any one of aspects 27-34, wherein analyzing the valve data including the respective valve parameter values to identify the mode of operation of the valve includes analyzing values corresponding to at least one of: a travel set point, a valve travel measurement, an instrument drive signal, an actuator pressure, a travel cycle, a cycle counter, a travel accumulator, or a control signal over the plurality of instances of time to identify the mode of operation of the valve.

36. The method of any one of aspects 27-35, wherein analyzing the valve data to identify the mode of operation of the valve includes: analyzing respective valve travel measurements of the valve over the plurality of instances of time during on-line operation of the process plant to determine an average valve travel per cycle; determining the valve is operating in the full stroke cycling mode when the average valve travel per cycle exceeds a threshold number; determining the valve is operating in the continuous throttling mode when the average valve travel per cycle does not exceed the threshold number; and determining the valve is operating in the periodic throttling mode when the valve alternates between operating in the full stroke cycling mode and operating in the continuous throttling mode.

37. The method of any one of aspects 27-36 in combination with the method of any one of aspects 1-14.

38. The method of any one of aspects 27-37, performed by the system of any one of aspects 15-26.

39. A system for detecting a mode of operation of a valve in a process plant, the system comprising: a valve operating within the process plant to control an industrial process; and one or computing devices including: one or more processors; a communication unit; and one or more non-transitory computer-readable media coupled to the one or more processors and to the communication unit, the one or more non-transitory computer-readable media storing instructions thereon that, when executed by the one or more processors, cause the one or more computing devices to:
receive, via the communication unit, data generated as a result of the valve operating within the process plant to control the industrial process, the valve data including respective valve parameter values of the valve for one or more valve parameters over a plurality of instances of time; analyze the valve data to identify, from a plurality of modes of valve operation, a mode of operation of the valve, the plurality of modes of valve operation including two or more of: full stroke cycling, continuous throttling, or periodic throttling; and transmit, via the communication unit, an indication of the identified mode of operation of the valve to at least one of a user interface or another application for analyzing operations in the process plant.

40. The system of the previous aspect, wherein the respective valve parameter values are a first set of valve parameters, and the instructions are executable to further cause the computing device to: select, based on the identified mode of operation of the valve, a second set of valve parameters; analyze a second set of valve parameter values of the second set of valve parameters over the plurality of instances of time to detect a condition of the valve, the second set of valve parameter values included in the valve data; and transmit, via the communication unit, an indication of the detected condition of the valve to the user interface.

41. The system of any one of aspects 39-40, wherein: the analysis of the second set of valve parameter values over the plurality of instances of time includes a combination of the second set of valve parameter values over the plurality of instances of time to generate a valve parameter metric of the valve; and the condition of the valve is detected based on the valve parameter metric.

42. The system of any one of aspects 39-41, further comprising a statistical model corresponding to the identified mode of operation of the valve and generated based on historical valve parameter values of valves operating in the identified mode of operation; and wherein the condition of the valve is detected based on an application of the valve parameter metric to the statistical model corresponding to the identified mode of operation of the valve.

43. The system of any one of aspects 39-42, wherein the statistical model is generated using one or more machine learning techniques, the one or more machine learning techniques including at least one of: linear regression, polynomial regression, logistic regression, naïve Bayes, decision trees, random forests, boosting, nearest neighbors, or neural networks.

44. The system of any one of aspects 39-43, wherein the detected condition of the valve includes at least one of: a performance metric, an error, dead band, dead time, or a leak at the valve.

45. The system of any one of aspects 39-44, wherein the analysis of the valve data to identify the mode of operation of the valve includes: a combination of the respective valve parameter values of the valve over the plurality of instances of time to generate a valve parameter metric of the valve; a comparison of the valve parameter metric of the valve to a plurality of statistical models respectively corresponding to the plurality of modes of valve operation, each statistical model corresponding to a respective mode of valve operation and generated based on respective historical valve parameter values of one or more valves operating according to the respective mode of valve operation; and an identification of the mode of operation of the valve based on the comparison.

46. The system of any one of aspects 39-45, wherein the plurality of statistical models are generated using one or more machine learning techniques.

47. The system of any one of aspects 39-46, wherein the valve data includes valve parameter values of the valve corresponding to at least one of: a travel set point, a valve travel measurement, an actuator pressure, a travel cycle, a cycle counter, a travel accumulator, or a control signal.

48. The system of any one of aspects 39-47, wherein: the analysis of the valve data includes an analysis of respective valve travel measurements of the valve over the plurality of instances of time during on-line operation of the process plant to determine an average valve travel per cycle; the valve is determined to be operating in the full stroke cycling mode when the average valve travel per cycle exceeds a threshold number; the valve is determined to be operating in the continuous throttling mode when the average valve travel per cycle does not exceed the threshold number; and the valve is determined to be operating in the periodic throttling mode when the valve alternates between operating in the full stroke cycling mode and the continuous throttling mode.

49. The system of any one of aspects 39-48, wherein the one or more computing devices are included in a cloud computing system.

50. The system of any one of aspects 39-49, wherein the cloud computing system and the process plant are communicatively connected via a data diode, the data diode configured to prevent data traffic from ingressing into the process plant.

51. The system of any one of aspects 39-50, further configured to perform the method of any one of aspects 27-38.

52. A method for detecting the health of a valve, the method comprising: receiving, at a computing device, data corresponding to a valve disposed in a process plant and operating to control an industrial process, the valve data including respective valve parameter values of the valve for one or more valve parameters over a plurality of instances of time; analyzing, by the computing device, the valve data to determine a value of an overall device health parameter of the valve; determining, by the computing device, a relative health indicator of the valve based on a comparison of the overall device health parameter value of the valve and respective overall device health parameter values of a plurality of valves; and providing the relative health indicator of the valve for at least one of: display at a user interface, storage in a data storage entity, or use by an executing application.

53. The method of the previous aspect, wherein: determining the relative health indicator of the valve based on the comparison of the overall device health parameter value of the valve in the respective overall device health parameter values of the plurality of valves includes ranking the plurality of valves based on the respective overall device health parameter values of the plurality of valves; and providing the relative health indicator of the valve includes providing an indication of the overall device health parameter value of the valve and an indication of the ranking of the plurality of valves.

54. The method of any one of aspects 52-53, wherein analyzing the valve data to determine the overall device health parameter value of the valve includes: combining the respective valve parameter values of the valve for the one or more valve parameters over the plurality of instances of time to generate one or more valve parameter metrics; and determining the overall device health parameter value of the valve based on the one or more valve parameter metrics.

55. The method of any one of aspects 52-54, further comprising generating a statistical model based on historical valve parameter values for the one or more valve parameters; and wherein determining the overall device health parameter value of the valve based on the one or more valve parameter metrics comprises applying the one or more valve parameter metrics to the statistical model.

56. The method of any one of aspects 52-55, further comprising: detecting a condition of the valve based on at least one of the overall device health parameter value of the valve or the relative health indicator of the valve; and transmitting an indication of the detected condition of the valve to the user interface.

57. The method of any one of aspects 52-56, wherein: (i) detected condition of the valve is a first detected condition; (ii) the method further comprises: generating, based on historical valve parameter values for the one or more valve parameters, a statistical model for detecting a second condition of the valve; detecting the second condition of the valve by applying the one or more valve parameter metrics to the statistical model; and comparing the first detected condition to the second detected condition; and (iii) transmitting the indication of the first detected condition of the valve to the user interface comprises transmitting the indication of the first detected condition of the valve to the user interface when the first detected condition differs from the second detected condition.

58. The method of any one of aspects 52-57, further comprising causing an alarm or an event to be generated at the process plant based on the detected condition of the valve.

59. The method of any one of aspects 52-58, further comprising transmitting a control signal to the process plant to adjust operations of the process plant based on the detected condition of the valve.

60. The method of any one of aspects 52-59, wherein detecting the condition of the valve includes at least one of: determining a performance metric of the valve, or detecting at least one of: an error, dead band, dead time, mechanical wear or a leak at the valve.

61. The method of any one of aspects 52-60, further comprising: generating indications of respective valve parameter values of the plurality of valves for the one or more valve parameters over the plurality of instances of time; and providing, to the user interface for display in a time series depiction, the indications of the respective valve parameter values of the plurality of valves for the one or more valve parameters over the plurality of instances of time in conjunction with the respective valve parameter values of the valve for the one or more valve parameters over the plurality of instances of time.

62. The method of any one of aspects 52-61 in combination with the method of any one of aspects 27-38.

63. A system for detecting the health of a plurality of valves, the system comprising: a plurality of valves, at least some of which are operating within a process plant to control an industrial process; and
one or more computing devices including: one or more processors; a communication unit; and one or more non-transitory computer-readable media coupled to the one or more processors and to the communication unit, the one or more non-transitory computer-readable media storing instructions thereon that, when executed by the one or more processors, cause the one or more computing devices to:
receive valve data corresponding to the plurality of valves, the valve data including respective valve parameter values, of each valve included in the plurality of valves, for one or more valve parameters over a plurality of instances of time; analyze the respective valve parameter values of the each valve to determine a respective overall device health parameter value for the each valve; and determine a respective relative health indicator for the each valve based on a comparison of the overall device health parameter values of the plurality of valves; and provide the respective relative health indicator of the each valve to at least one of a user interface, a data storage entity, or an executing application.

64. The system of the previous aspect, wherein: the respective relative health indicators of the plurality of valves are determined based on a ranking of the plurality of valves based on the overall device health parameter values of the plurality of valves; and an indication of the ranking of the plurality of valves is provided in conjunction with the relative health indicator of the each valve.

65. The system of any one of aspects 63-64, wherein: the analysis of the respective valve parameter values of the each valve includes a combination of the respective valve parameter values of the each valve over the plurality of instances of time to generate a valve parameter metric of the each valve; and the value of the respective overall device health parameter for the each valve is based on the valve parameter metric of the each valve.

66. The system of any one of aspects 63-65, further comprising a statistical model generated based on historical valve parameter values for the one or more valve parameters; and the value of the respective overall device health parameter for the each valve is determined by an application of the valve parameter metric of the each valve to the statistical model.

67. The system of any one of aspects 63-66, wherein each of the historical valve parameter values is associated with a corresponding device health score for a corresponding valve, and the statistical model is generated further based on the corresponding device health scores associated with the historical valve parameter values.

68. The system of any one of aspects 63-67, wherein the statistical model is generated using one or more machine learning techniques, the one or more machine learning techniques including at least one of: linear regression, polynomial regression, logistic regression, naïve Bayes, decision trees, random forests, boosting, nearest neighbors, or neural networks.

69. The system of any one of aspects 63-68, wherein the instructions are further executable to cause the one or more computing devices to: detect a condition of the each valve based on the respective relative health indicator of the each valve; and transmit an indication of the detected condition of the each valve to the user interface.

70. The system of any one of aspects 63-69, wherein the detected condition of the each valve includes at least one of: a performance metric, an error, a leak, dead band, or mechanical wear at the each valve.

71. The system of any one of aspects 63-70, further comprising a data diode configured to prevent two-way communications between a network of the process plant and the one or more computing devices; and wherein the valve data is secured for transmission from the process plant to the one or more computing devices via the data diode.

72. The system of any one of aspects 63-71, wherein the one or more computing devices are included in a cloud computing system.

73. The system of any one of aspects 63-72, wherein the instructions are further executable to cause the one or more computing devices to: generate indications of respective valve parameter values of the plurality of valves for the one or more valve parameters over the plurality of instances of time; and provide, to the user interface for display in a time series depiction, the indications of the respective valve parameter values of the plurality of valves for the one or more valve parameters over the plurality of instances of time.

74. The system of any one of aspects 63-73, further configured to perform the method of any one of aspects 52-62.

75. Any one of the previous aspects in combination with any other one of the previous aspects.

When implemented in software, any of the applications, services, and engines described herein may be stored in any tangible, non-transitory computer readable memory such as on a magnetic disk, a laser disk, solid state memory device, molecular memory storage device, or other storage medium, in a RAM or ROM of a computer or processor, etc. Although the example systems disclosed herein are disclosed as including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, while the example systems described herein are described as being implemented in software executed on a processor of one or more computer devices, persons of ordinary skill in the art will readily appreciate that the examples provided are not the only way to implement such systems.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed:

1. A method for detecting a condition of a process plant entity by using data that is securely transported from a process plant to a cloud computing system, the method comprising:

receiving, at the cloud computing system, data generated by one or more devices of the process plant while the process plant is operating to control an industrial process including receiving, at a plurality of instances of time, respective process parameter values for each of one or more process parameters of a process plant entity performing a physical function to control the industrial process in the process plant, the process plant entity corresponding to the one or more devices, wherein the data is secured for transmission from the one or more devices to the cloud computing system via a field gateway, a data diode, and an edge gateway, and the data diode is configured to prevent two-way communications between a network of the process plant and a network of the cloud computing system;

analyzing, at the cloud computing system, the data thereby detecting a condition of the process plant entity including:

for each of the one or more process parameters, combining the respective process parameter values of the one or more process parameters over the plurality of instances of time to generate a process parameter metric, generating a statistical model based on historical process parameter values collected over time of the one or more process parameters; and applying the process parameter metrics for each of the one or more process parameters to the statistical model; and transmitting an indication of the condition of the process plant entity to a user interface device to alert an operator to the condition.

2. The method of claim 1, wherein combining the respective process parameter values of the one or more process parameters over the plurality of instances of time to generate the process parameter metric includes calculating at least one of: a moving average of the respective process parameter values or a decaying average of the respective process parameter values over the plurality of instances of time to generate the process parametric metric.

3. The method of claim 1, wherein generating the statistical model based on the historical process parameter values of the one or more process parameters comprises:

classifying each historical process parameter value as corresponding to a first set of process parameter values for one or more process plant entities that have experienced the condition or as corresponding to a second set of process parameter values for one or more process plant entities that have not experienced the condition; and generating the statistical model based on the classifications of the historical process parameter values.

4. The method of claim 1, further comprising:

receiving an indication of whether or not the process plant entity has experienced the condition; and updating the historical process parameter values to include the respective process parameter values of the one or more process parameters of the process plant entity and based on the indication of whether or not the process plant entity has experienced the condition.

5. The method of claim 1, wherein detecting the condition of the process plant entity includes detecting two or more of: an error, dead band, dead time, or a leak at the process plant entity; and wherein generating a statistical model based on historical process parameter values collected over time of the one or more process parameters includes generating a different statistical model for each type of condition and applying the process parameter metrics for each of the one or more process parameters to the statistical model for each type of condition to detect the respective type of condition of the process plant entity.

6. The method of claim 1, further comprising:

causing an alarm or an event to be generated at the process plant based on the detected condition of the process plant entity.

7. The method of claim 1, further comprising:

transmitting a control signal to the process plant to adjust an operation of the process plant entity based on the detected condition of the process plant entity.

8. The method of claim 1, wherein receiving data generated by the one or more devices includes receiving real-time data streamed from the one or more devices to the cloud computing system via the data diode.

9. A system for detecting a condition of a process plant entity of a process plant, the system comprising:

one or more devices corresponding to a process plant entity disposed in the process plant and performing a physical function to control an industrial process;

a data diode communicatively connecting the one or more devices to one or more cloud computing devices, the data diode configured to prevent two-way communications between a network of the process plant and the one or more cloud computing devices, the data diode including one or more input ports, one or more output ports, and a communication link interconnecting the one or more input ports to the one or more output ports;

a field gateway interconnecting the process plant network and the one or more input ports of the data diode;

an edge gateway interconnecting the one or more output ports of the data diode and the one or more cloud computing devices; and the one or more cloud computing devices comprising:

one or more processors;

a communication unit; and one or more non-transitory computer-readable media coupled to the one or more processors and to the communication unit, the one or more non-transitory computer-readable media storing instructions thereon that, when executed by the one or more processors, cause the cloud computing device to:

receive, via the data diode and the communication unit, data generated by the one or more devices of the process plant while the process plant is on-line, the data secured for transmission from the one or more devices to the cloud computing device via the data diode, including receive, at a plurality of instances of time, respective process parameter values for each of one or more process parameters of the process plant entity;

analyze the data to detect a condition of the process plant entity including:

for each of the one or more process parameters, combine the respective process parameter values of the one or more process parameters over the plurality of instances of time to generate a process parameter metric, generate a statistical model based on historical process parameter values collected over time of the one or more process parameters; and apply the process parameter metrics for each of the one or more process parameters to the statistical model; and transmit, via the communication unit to a user interface device, an indication of the condition for the process plant entity to alert an operator to the condition.

10. The system of claim 9, wherein the combination of the respective process parameter values comprises at least one of: a moving average of the respective process parameter values or a decaying average of the respective process parameter values.

11. The system of claim 9, wherein the statistical model is generated based on a classification of each historical process parameter value as corresponding to a first set of process parameter values of one or more process plant entities that have experienced the condition or as corresponding to a second set of process parameter values of one or more process plant entities that have not experienced the condition.

12. The system of claim 9, wherein the statistical model is generated by using one or more machine learning techniques, the one or more machine learning techniques including: linear regression, polynomial regression, logistic regression, naïve Bayes, decision trees, random forests, boosting, nearest neighbors, or neural networks.

13. The system of claim 9, wherein the one or more process parameters are indicative of at least one of: a pressure, a temperature, a flow rate, a density, an area, or a volume.

14. The system of claim 9, wherein the condition of the process plant entity includes at least one of: a performance monitoring metric, an error, dead band, dead time, or a leak at the process plant entity.

15. The system of claim 9, wherein the one or more devices include at least one of: a field device or a controller executing a control routine that utilizes signals that are at least one of generated by or sent to the field device.

16. The system of claim 9, wherein the process plant entity includes at least one of: a valve, a field device, an I/O device, a controller coupled to the field device via the I/O device, tank, a mixer, a pump, or a heat exchanger.

* * * * *